(«12») United States Patent
Chen et al.

(10) Patent No.: US 9,916,144 B2
(45) Date of Patent: *Mar. 13, 2018

(54) ARRANGING BINARY CODE BASED ON CALL GRAPH PARTITIONING

(71) Applicant: International Business Machines Corporation, Armonk, NY (US)

(72) Inventors: Tong Chen, Yorktown Heights, NY (US); Brian Flachs, Georgetown, TX (US); Brad W. Michael, Cedar Park, TX (US); Mark R. Nutter, Austin, TX (US); John K. P. O'Brien, South Salem, NY (US); Kathryn M. O'Brien, South Salem, NY (US); Tao Zhang, Englewood Cliffs, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/274,309

(22) Filed: Sep. 23, 2016

(65) Prior Publication Data

US 2017/0010873 A1 Jan. 12, 2017

Related U.S. Application Data

(63) Continuation of application No. 12/823,244, filed on Jun. 25, 2010, now Pat. No. 9,459,851.

(51) Int. Cl.
*G06F 9/45* (2006.01)
(52) U.S. Cl.
CPC .................. *G06F 8/4442* (2013.01)
(58) Field of Classification Search
CPC ........ G06F 8/4442; G06F 8/443; G06F 8/433; G06F 8/4441; G06F 17/30312

USPC .................................................. 717/156–160
See application file for complete search history.

(56) References Cited

U.S. PATENT DOCUMENTS

| | | |
|---|---|---|
| 5,313,616 A | 5/1994 | Cline et al. |
| 5,778,228 A | 7/1998 | Wei |
| 5,926,632 A | 7/1999 | Kawaguchi |
| 6,112,280 A | 8/2000 | Shah et al. |
| 6,175,957 B1 | 1/2001 | Ju et al. |
| 6,205,545 B1 | 3/2001 | Shah et al. |

(Continued)

FOREIGN PATENT DOCUMENTS

WO    WO 02/27498 A2    4/2002

OTHER PUBLICATIONS

U.S. Appl. No. 12/648,741.
(Continued)

*Primary Examiner* — Tuan Vu
(74) *Attorney, Agent, or Firm* — Stephen J. Walder, Jr.; Thomas E. Tyson

(57) ABSTRACT

Mechanisms are provided for arranging binary code to reduce instruction cache conflict misses. These mechanisms generate a call graph of a portion of code. Nodes and edges in the call graph are weighted to generate a weighted call graph. The weighted call graph is then partitioned according to the weights, affinities between nodes of the call graph, and the size of cache lines in an instruction cache of the data processing system, so that binary code associated with one or more subsets of nodes in the call graph are combined into individual cache lines based on the partitioning. The binary code corresponding to the partitioned call graph is then output for execution in a computing device.

19 Claims, 16 Drawing Sheets

(56) References Cited

U.S. PATENT DOCUMENTS

| | | |
|---|---|---|
| 6,317,870 B1 | 11/2001 | Mattson, Jr. |
| 6,330,556 B1 | 12/2001 | Chilimbi et al. |
| 6,360,361 B1 | 3/2002 | Larus et al. |
| 6,427,234 B1 | 7/2002 | Chambers et al. |
| 6,453,411 B1 | 9/2002 | Hsu et al. |
| 6,463,582 B1 | 10/2002 | Lethin et al. |
| 6,481,008 B1 | 11/2002 | Chaiken et al. |
| 6,598,221 B1 | 7/2003 | Pegatoquet et al. |
| 6,609,248 B1 | 8/2003 | Srivastava et al. |
| 6,622,300 B1 | 9/2003 | Krishnaswamy et al. |
| 6,721,875 B1 | 4/2004 | McCormick, Jr. et al. |
| 6,725,335 B2 | 4/2004 | Bala et al. |
| 6,728,788 B1 | 4/2004 | Ainsworth et al. |
| 6,795,964 B2 | 9/2004 | Ramasamy et al. |
| 6,817,014 B2 | 11/2004 | Hundt et al. |
| 6,839,895 B1 | 1/2005 | Ju et al. |
| 6,865,735 B1 | 3/2005 | Sirer et al. |
| 6,934,943 B2 | 8/2005 | Hundt et al. |
| 6,966,057 B2 | 11/2005 | Lueh |
| 6,968,546 B2 | 11/2005 | Lueh |
| 7,039,910 B2 | 5/2006 | Kosche et al. |
| 7,526,502 B2 | 4/2009 | Hall et al. |
| 7,526,760 B1 | 4/2009 | Daynes et al. |
| 7,577,965 B2 | 8/2009 | Tobin |
| 7,856,628 B2 | 12/2010 | Li et al. |
| 8,516,230 B2 | 8/2013 | Chen et al. |
| 8,522,225 B2 | 8/2013 | Chen et al. |
| 8,627,051 B2 | 1/2014 | Chen et al. |
| 8,631,225 B2 | 1/2014 | Chen et al. |
| 8,713,548 B2 | 4/2014 | Chen et al. |
| 8,782,381 B2 | 7/2014 | Chen et al. |
| 2002/0144241 A1 | 10/2002 | Lueh |
| 2002/0144245 A1 | 10/2002 | Lueh |
| 2002/0194580 A1 | 12/2002 | Ramasamy et al. |
| 2003/0009750 A1 | 1/2003 | Hundt et al. |
| 2003/0079215 A1 | 4/2003 | Hundt et al. |
| 2004/0133777 A1 | 7/2004 | Kiriansky et al. |
| 2005/0108562 A1 | 5/2005 | Khazan et al. |
| 2005/0155023 A1 | 7/2005 | Li et al. |
| 2005/0246700 A1 | 11/2005 | Archambault et al. |
| 2006/0059195 A1 | 3/2006 | Hall et al. |
| 2006/0095895 A1 | 5/2006 | K |
| 2007/0027877 A1 | 2/2007 | Droshev et al. |
| 2007/0174819 A1 | 7/2007 | Li et al. |
| 2007/0286483 A1 | 12/2007 | Delong et al. |
| 2008/0126771 A1 | 5/2008 | Chen et al. |
| 2008/0282035 A1 | 11/2008 | Hundt et al. |
| 2009/0307430 A1 | 12/2009 | Bruening et al. |
| 2010/0306746 A1 | 12/2010 | Barua et al. |
| 2011/0161641 A1 | 6/2011 | Chen et al. |
| 2011/0320785 A1 | 12/2011 | Chen et al. |
| 2011/0320786 A1 | 12/2011 | Chen et al. |
| 2011/0321002 A1 | 12/2011 | Chen et al. |
| 2011/0321021 A1 | 12/2011 | Chen et al. |
| 2012/0198169 A1 | 8/2012 | Chen et al. |
| 2012/0198170 A1 | 8/2012 | Chen et al. |
| 2012/0198429 A1 | 8/2012 | Chen et al. |
| 2012/0204016 A1 | 8/2012 | Chen et al. |

OTHER PUBLICATIONS

U.S. Appl. No. 12/823,194.
U.S. Appl. No. 12/823,204.
U.S. Appl. No. 12/823,226.
U.S. Appl. No. 12/823,244.
U.S. Appl. No. 13/442,919.
U.S. Appl. No. 13/443,188.
U.S. Appl. No. 13/444,890.
U.S. Appl. No. 13/444,907.
Chen, Tong et al., "SPE Software Instruction Cache", U.S. Appl. No. 12/648,741, filed Dec. 29, 2009, 33 pages.
Gilbert, John et al., "Adaptive Object Code Compression", CASES'06, Oct. 23-25, 2006, pp. 282-292.
Hazelwood, Kim et al., "A Dynamic Binary Instrumentation Engine for the ARM Architecture", CASES'06, Oct. 23-25, 2006, pp. 261-270.
Hu, Wei et al., "Secure and Practical Defense Against Code-injection Attacks using Software Dynamic Translation", VEE'06, Jun. 14-16, 2006, pp. 2-12.
Huneycutt, Chad et al., "Software Caching using Dynamic Binary Rewriting for Embedded Devices", In Proceedings of the International Conference on Parallel Processing, 2001, 6 pages.
Larus, James R. et al., "Rewriting Executable Files to Measure Program Behavior", Computer Sciences Department University of Wisconsin-Madison, Oct. 24, 1994, 23 pages.
Lin, Charles, "Direct Mapped Cache", Obtained via http://www.cs.umd.edu/class/sum2003/cmsc311/Notes/, May 16, 2003, 3 pages.
Lu, Jiwei et al., "The Performance of Runtime Data Cache Prefetching in a Dynamic Optimization System", Proceedings of the 36th International Symposium on Microarchitecture (MICRO-36'03), IEEE, 2003, 11 pages. 2003.
Miller, Jason E. et al., "Flexicache: Software-based Instruction Caching for Embedded Processors", ASPLOS '06, Oct. 21-25, 2006, 33 pages.
Miller, Jason E. et al., "Software-based Instruction Caching for Embedded Processors", ACM, ASPLOS'06, Oct. 21-25, 2006, pp. 293-302. 2006, 293-302.
Nanda, Susanta et al., "BIRD: Binary Interpretation using Runtime Disassembly", IEEE, Proceedings of the International Symposium on Code Generation and Optimization, 2006, 12 pages.
Noori, Hamid et al., "Enhancing Energy Efficiency of Processor-Based Embedded Systems through Post-Fabrication ISA Extension", ISLPED '08, Aug. 11-13, 2008, pp. 241-246.
Ramirez, Alex et al., "Software Trace Cache", ACM, International Conference on Supercomputing ICS'99, 1999, pp. 119-126.
Ramsey, Norman et al., "A Transformational Approach to Binary Translation of Delayed Branches", ACM Transactions on Programming Languages and Systems, vol. 25, No. 2, Mar. 2003, pp. 210-224.

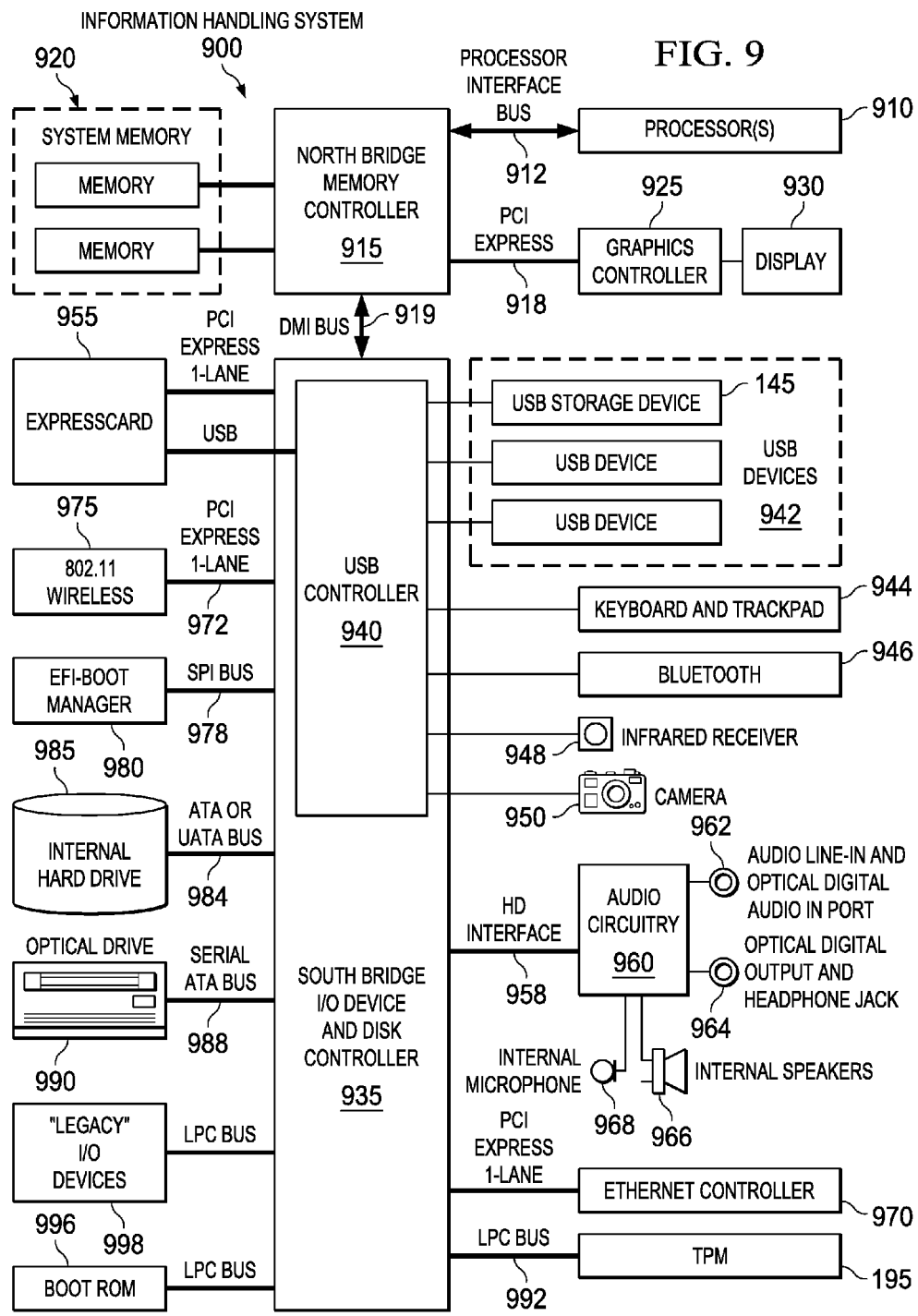

ARRANGING BINARY CODE BASED ON CALL GRAPH PARTITIONING

This application is a continuation of application Ser. No. 12/823,244, filed Jun. 25, 2010, status awaiting publication.

BACKGROUND

The present application relates generally to an improved data processing apparatus and method and more specifically to mechanisms for arranging binary code based on call graph partitioning to reduce instruction cache conflict misses.

Many modern computing devices utilize a multiprocessor architecture in which multiple processors are provided to increase the computation power of the computing device. One example of a modern multiprocessor architecture is the Cell Broadband Engine (CBE) available from International Business Machines Corporation or Armonk, N.Y. With the CBE, a primary control processor, referred to as the PPE, is provided along with a plurality of controlled processors, referred to as synergistic processing elements (SPEs). Each SPE has a local memory, or local store, into which instructions and data are copied so that the SPE may execute instructions in the local store on data brought into the location store from main memory. Thus, the local store serves as both an instruction and data cache for the SPE. Other multiprocessor architectures utilize similar configurations in which the processors may have a local instruction cache and data cache into which data and instructions are brought before executing on the processor or having the processor operate on the data.

Typically, the local store, or cache, of a modern day multiprocessor architecture is designed to be much smaller in storage size than the main memory. Thus, executing code larger than the processor's local store or cache size requires a strategy for swapping pieces of code, or code segments, into the local store or cache before use. In some cases, a code segment may include branch instructions whose target instruction is located in a different code segment that may not be currently present in the local store or cache. This would require a strategy for bringing in the code segment corresponding to the target instruction from main memory.

SUMMARY

In one illustrative embodiment, a method, in a data processing system, is provided for arranging binary code to reduce instruction cache conflict misses. The method comprises generating, by a processor of the data processing system executing a compiler, a call graph of a portion of code. The method further comprises weighting, by the compiler, nodes and edges in the call graph to generate a weighted call graph. The method also comprises partitioning, by the compiler, the weighted call graph according to the weights, affinities between nodes of the call graph, and the size of cache lines in an instruction cache of the data processing system, so that binary code associated with one or more subsets of nodes in the call graph are combined into individual cache lines based on the partitioning. Moreover, the method comprises outputting, by the compiler, the binary code corresponding to the partitioned call graph for execution in a computing device.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 9 illustrates information handling system, which is another embodiment of a simplified example of a computer system capable of performing the computing operations described herein;

DETAILED DESCRIPTION

Figure 1:
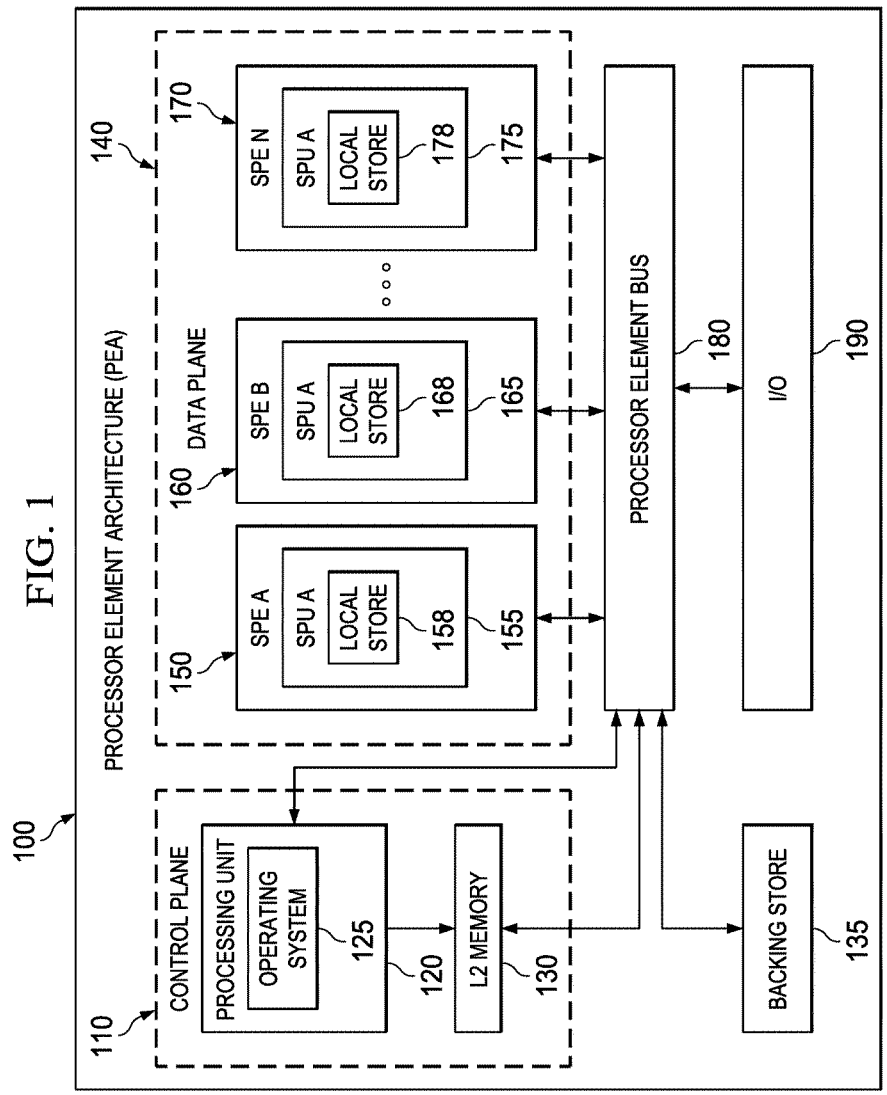
FIG. 1 is an example embodiment of an information handling system capable of implementing aspects of the illustrative embodiments set forth herein.

The illustrative embodiments provide a mechanism for statically and dynamically rewriting branch instructions so that they may be more optimally executed in view of the limited size of local stores or caches of a processor. In particular, the mechanisms of the illustrative embodiments provide functionality for rewriting code, both statically by a compiler and dynamically by an instruction cache runtime system, to thereby generate and utilize branch stubs in the code for branch instructions. The branch stubs may be used as a basis for holding information about the branch instruction for use in determining whether a jump directly to a target of the branch instruction in the instruction cache may be possible or not. Examples of branch instructions include function calls, conditional branch instructions, unconditional branch instructions, function returns, and the like, as is generally known in the art.

In addition, the mechanisms of the illustrative embodiments provide functionality for performing dynamic rewriting of branches based on whether or not the possible targets of the branches are known or not. The rewriting of the branch instructions allows the code to directly jump to target code in the instruction cache when possible rather than having to go through an instruction cache manager to determine if the target code is present in the instruction cache or not. In general, when the target code is loaded into the instruction cache, the branch instruction is rewritten as a jump to the location of the target code in the instruction cache. When the target code is evicted from the instruction cache, the branch instruction is restored since it cannot jump to the target code directly but must trigger a software instruction cache mechanism to handle the jump to the target code.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is an example embodiment of an information handling system capable of implementing aspects of the illustrative embodiments set forth herein. The example information handling system shown in FIG. 1 is an example of a Cell Broadband Engine (CBE) architecture available from International Business Machines Corporation of Armonk, N.Y. It should be appreciated, however, that the present invention is not limited to use with the CBE and other information handling system architectures, configurations, and the like, may be used without departing from the spirit and scope of the illustrative embodiments.

Processor element architecture (100) includes multiple heterogeneous processors that share a common memory and a common bus. Processor element architecture (PEA) 100 sends and receives information to/from external devices through input output 190, and distributes the information to control plane 110 and data plane 140 using processor element bus 180. Control plane 110 manages PEA 100 and distributes work to data plane 140.

Control plane 110 includes processing unit 120, which runs operating system (OS) 125. For example, processing unit 120 may be a Power PC core that is embedded in PEA 100 and OS 125 may be a Linux operating system. Processing unit 120 manages a common memory map table for PEA 100. The memory map table corresponds to memory locations included in PEA 100, such as L2 memory 130 as well as non-private memory included in data plane 140.

Data plane 140 includes Synergistic Processing Elements (SPE) 150, 160, and 170. Each SPE processes data information and each SPE may have different instruction sets. For example, PEA 100 may be used in a wireless communications system and each SPE may be responsible for separate processing tasks, such as modulation, chip rate processing, encoding, and network interfacing. In another example, each SPE may have identical instruction sets and may be used in parallel to perform operations benefiting from parallel processes. Each SPE includes a synergistic processing unit (SPUs 155, 165, 175), which is a processing core, such as a digital signal processor, a microcontroller, a microprocessor, or a combination of these cores. Each SPU includes a local storage area (local stores 158, 168, and 178), which may be segmented into private and non-private memory. Each of local stores 158, 168, and 178 store a cache directory and tag directory (instruction and/or data), along with a cache manager (see FIG. 2 and corresponding text for further details). And, each cache manager within each SPU manages their corresponding cache and retrieves data from backing store 135 accordingly.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory (see FIG. 9 and corresponding text for another embodiment of an information handling system for performing compilation functions as described herein).

Figure 2:
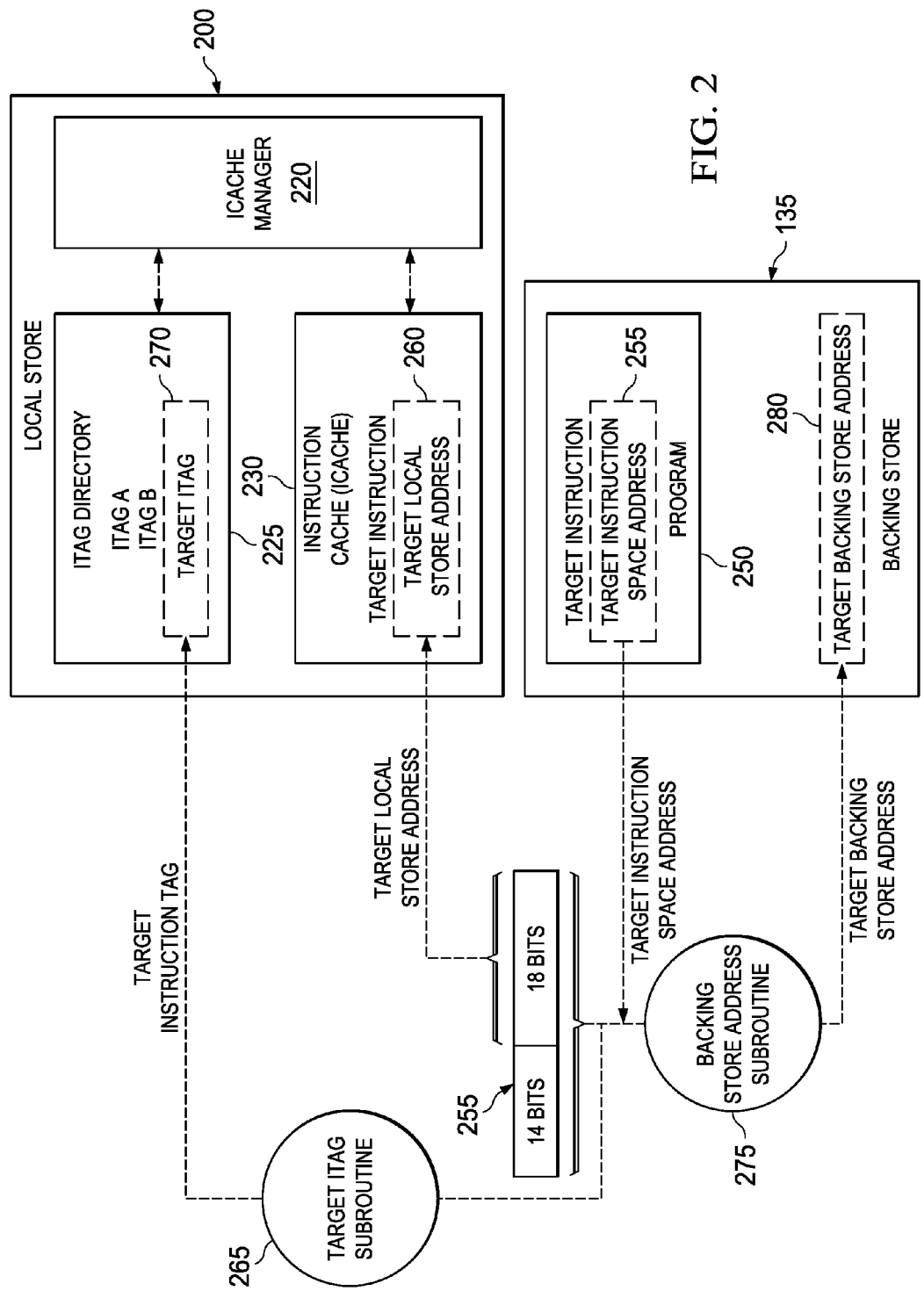
FIG. 2 is a diagram showing embodiments of a software controlled instruction cache (icache) manager translating a target instruction space address to other types of instruction addresses.

FIG. 2 is a diagram showing embodiments of an instruction cache (icache) manager translating a target instruction space address to other types of instruction addresses. Local store 200 resides within a synergistic processing unit (e.g., SPU's 155, 165, or 175) and includes instruction cache (icache) manager 220, instruction tag (ITAG) directory 225, and instruction cache 230.

In order to effectively move instructions from backing store 135 to icache 230, icache manager 220 requires an effective address within backing store 135 that corresponds to the location of the target instruction (target backing store address 280), as well as a local storage address within icache 230 to store the instruction (target local store address 260). In addition, icache manager 220 requires an instruction tag that corresponds to the target instruction in order to utilize ITAG directory 225 and determine a cache hit or a cache miss (target ITAG 270). As discussed herein, icache manager 220 uses an instruction's "instruction space address" (target instruction space address 255) to compute an instruction's target backing store address, target local store address, and target ITAG. The instruction space address is an address given to an instruction at link/load time based upon the location of the instruction in a program (program 250).

When icache manager 220 is requested (by an application thread) to branch to a particular target instruction, icache manager 220 determines whether the target instruction already resides in icache 230 by checking whether the target instruction's corresponding instruction tag (ITAG) is located in ITAG directory 225 (target ITAG 270). In order to generate target ITAG 270, icache manager 220 uses target ITAG subroutine 265, which generates target ITAG 270 using target instruction space address 255 and a tag array mask (see FIG. 8B and corresponding text for further details).

When icache manager 200 needs to load the target instruction from backing store 135 into icache 230, icache manager 220 computes the location of the target instruction in backing store 135 (target backing store address 280) as well as the location to store the target instruction in icache 230 (target local store address 260). Icache manager 220 utilizes target instruction space address 255 to generate these addresses as discussed below.

In the example shown in FIG. 2, target instruction space address 255 is 32 bits. Target instruction space address 255's 18 least significant bits, however, is target local store address 260 because local store 200 is 256 KB in size and only requires 18 bits for addressing into icache 230. As such, icache manager 220 masks off target instruction space address 255's 14 most significant bits in order to generate target local store address 260 (see FIG. 8A and corresponding text for further details). As those skilled in the art can appreciate, more or less bits may be required for target local store address 260 based upon the size of local store 200.

Figure 8A:
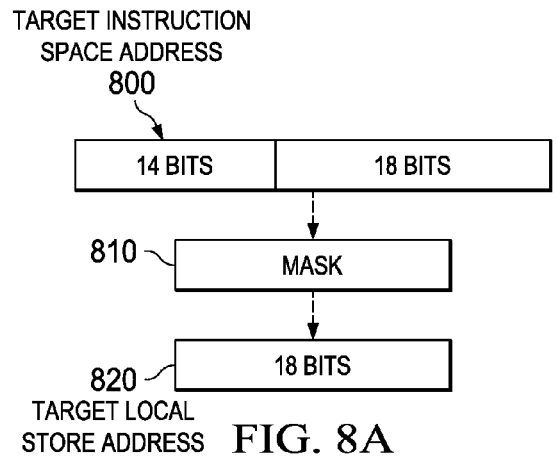
FIG. 8A shows a target instruction space address translated into a target local store address in accordance with one illustrative embodiment.
Figure 8B:
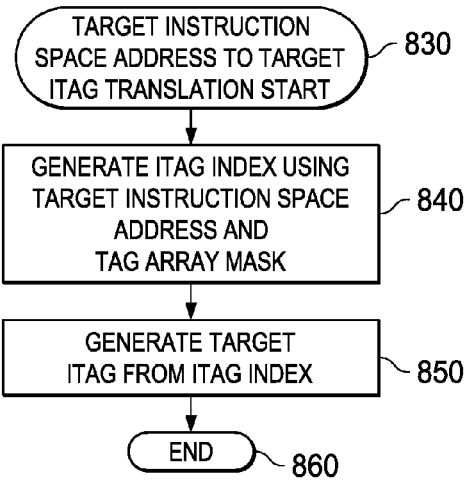
FIG. 8B is a flowchart showing steps taken in an icache manager translating a target instruction space address to a target instruction tag (ITAG) in accordance with one illustrative embodiment.
Figure 8C:
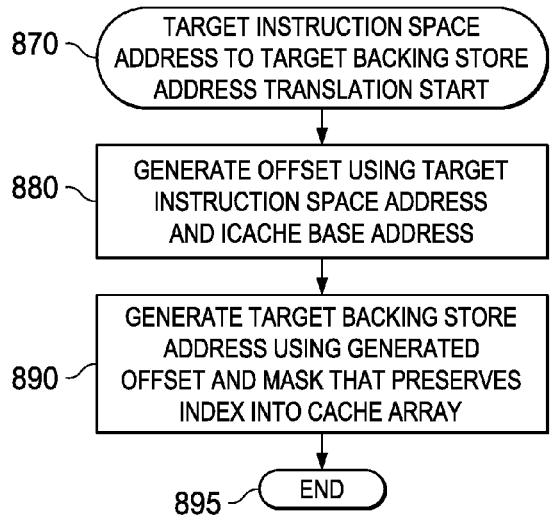
FIG. 8C is a flowchart showing steps taken in an icache manager translating a target instruction space address to a target backing store address in accordance with one illustrative embodiment.

In order to identify the location in backing store 135 to retrieve the instruction (target backing store address 280), icache manager 220 uses backing store subroutine 275, which generates an offset using target instruction space address 255 and an icache base address, and uses the offset and a mask to generate target backing store address 280 (see FIG. 8C and corresponding text for further details). In turn, icache manager 220 retrieves the target instruction from target backing store address 280; stores the target instruction in target local store address 260; and updates ITAG directory 225 accordingly.

Figure 3:
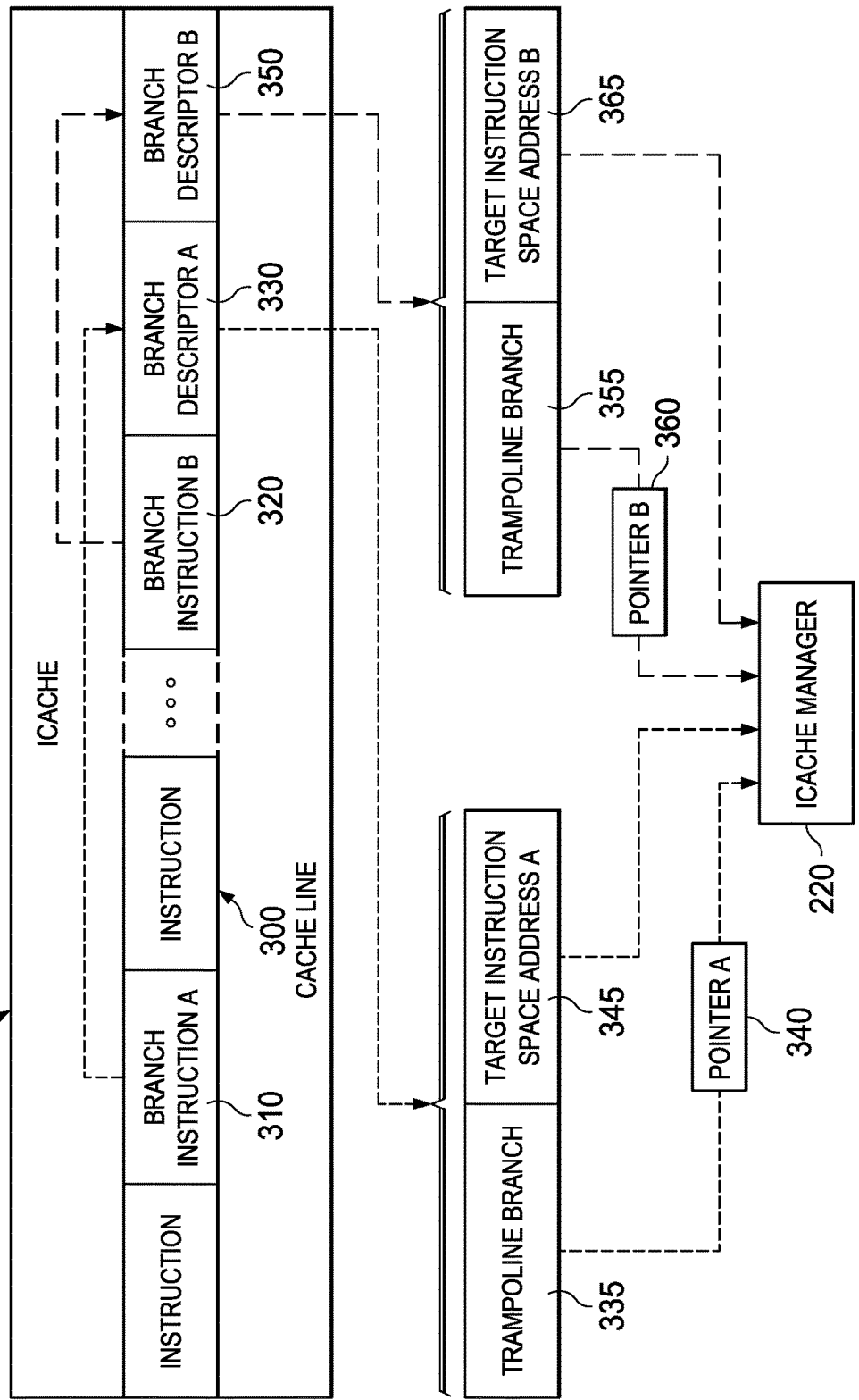
FIG. 3 is a diagram showing a cache line that includes direct branch instructions and corresponding branch descriptors in accordance with one illustrative embodiment.

FIG. 3 is a diagram showing a cache line that includes direct branch instructions and corresponding branch descriptors in accordance with one illustrative embodiment. A "direct" branch instruction is an instruction in which the address of a next instruction to execute, i.e. the target of the branch instruction, is explicitly specified. An "indirect" branch instruction is one in which the address of the next instruction to execute is not explicitly specified but instead the argument of the branch instruction specifies where the address is located. Thus, an example of an indirect branch instruction could be of the type "jump indirect on the r1 register," which means that the next instruction to be executed would be at the address whose value is stored in register r1. It should be noted that indirect branch instructions can also depend on the value of a memory location, rather than a specified register. Thus, with indirect branch instructions, the address of the next instruction to execute is not known at compile time, but is only known once the branch instruction is executed, i.e. at runtime. With direct branch instructions, the target of the branch instruction is known at compile time.

One aspect of the illustrative embodiment is that, during source compilation, a compiler adds a "branch descriptor" into a program for each direct branch instruction and, in turn, an icache manager loads the branch descriptors into the same instruction cache line during runtime execution. FIG. 3 shows instruction cache 230, which includes cache line 300. Cache line 300 includes multiple instructions, some of which are direct branch instructions 310 and 320. Cache line 300 also includes branch descriptors 330 and 350, which correspond to direct branch instructions 310 and 320, respectively.

When an application thread executes direct branch instruction 310, direct branch instruction 310 branches to branch descriptor 330. Branch descriptor 330 includes trampoline branch instruction 335 and target instruction space address 345. A trampoline branch is an instruction that, when executed, branches to, or "bounces" to icache manager 220, thus causing a trampoline effect. When branch instruction 310 branches to branch descriptor 330, trampoline branch instruction 335 is invoked, which branches to icache manager 220 and loads pointer 340 into a link register via a branch and set link instruction, which points back to branch descriptor 330. In turn, icache manager 220 uses pointer 340 to locate branch descriptor 330 and retrieve target instruction space address 345. Icache manager 220 uses target instruction space address 345 to generate various addresses and locate a target instruction corresponding to direct branch instruction 310 (see FIG. 5 and corresponding text for further details).

Likewise, when the application thread executes direct branch instruction 320, the branch instruction branches to branch descriptor 350, which is different than branch descriptor 330. Branch descriptor 350 includes trampoline branch instruction 355 and target instruction space address 365. Target instruction space address 365 corresponds to a location of the target instruction for branch instruction 320. When branch instruction 320 branches to branch descriptor 350, trampoline branch instruction 355 is invoked, which branches to icache manager 220 and loads pointer 360 into the link register via a branch and set link instruction, which points back to branch descriptor 350. In turn, icache manager 220 uses pointer 360 to locate branch descriptor 350 and retrieve target instruction space address 365.

Figure 4:
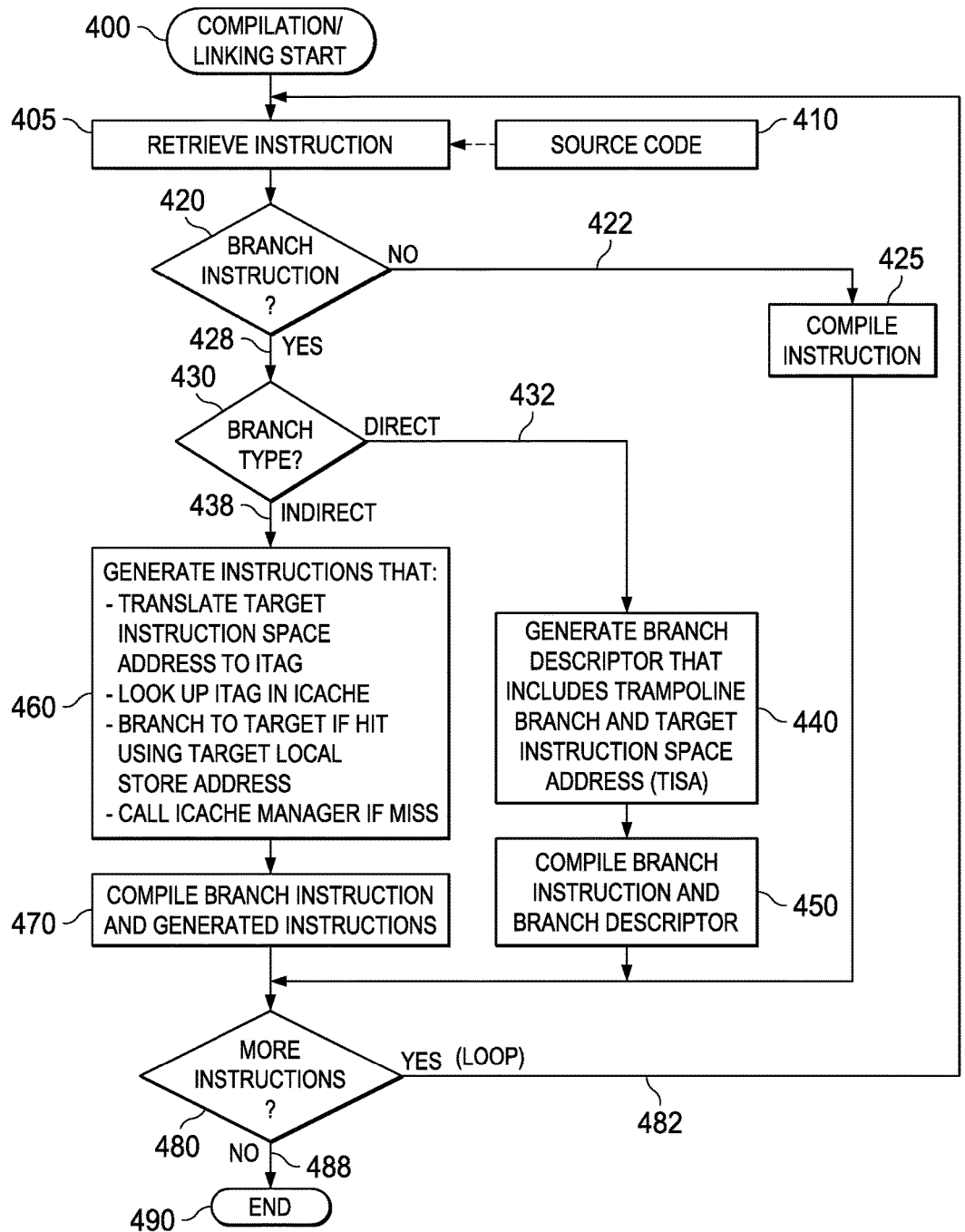
FIG. 4 is a flowchart showing steps taken in compiling various branch instruction types in accordance with one illustrative embodiment.

FIG. 4 is a flowchart showing steps taken in compiling various branch instruction types in accordance with one illustrative embodiment. The illustrative embodiments described herein includes embodiments discussing code compilation/linking, and embodiments discussing code execution (e.g., runtime environment). FIG. 4 shows steps taken by a compiler (and/or linker) when the compiler encounters a branch instruction while compiling source code.

Processing commences at 400, whereupon processing retrieves an instruction from source code 410 at step 405. A determination is made as to whether the retrieved instruction is a branch instruction (decision 420). If the instruction is not a branch instruction, decision 420 branches to "No" branch 422 whereupon processing compiles the instruction (step 425) in a traditional manner known to those skilled in the art.

On the other hand, if the retrieved instruction is a branch instruction, decision 420 branches to "Yes" branch 428, whereupon a determination is made as to the type of branch instruction (decision 430). If the instruction is a direct branch instruction, decision 430 branches to "Direct" branch 432 whereupon processing generates a branch descriptor that includes a trampoline branch instruction and a target instruction space address at step 440. During runtime execution, the direct branch instruction branches to the trampoline branch instruction, which sends a pointer to the icache manager and, in turn, the icache manager retrieves the target instruction space address from the branch descriptor (see FIGS. 3, 5, and corresponding text for further details). At step 450, processing compiles the branch instruction and branch descriptor.

If the branch type is an indirect branch, however, decision 430 branches to "Indirect" branch 438, whereupon processing generates a number of instructions (step 460) to handle the indirect branch during runtime execution. The instructions include an instruction to translate the indirect branch's target instruction space address to an instruction tag (ITAG) along with an instruction to look up the ITAG in an icache directory (icache directory 225 shown in FIG. 2). Processing also generates instructions in order to handle hit or miss outcomes of the lookup. For example, processing generates an instruction that translates the target instruction space address to a target local store address in order to branch to the instruction in icache if the lookup results in a cache hit, and also generates an instruction that calls the icache manager if the lookup results in a cache miss. At step 470, processing compiles the instructions.

A determination is made as to whether there are more instructions to process in source code 410 (decision 480). If there are more instructions to process, processing branches to "Yes" branch 482, which loops back to retrieve and process the next instruction. This looping continues until there are no more source code instruction to process, at which point decision 480 branches to "No" branch 488 whereupon processing ends at 490.

Figure 5:
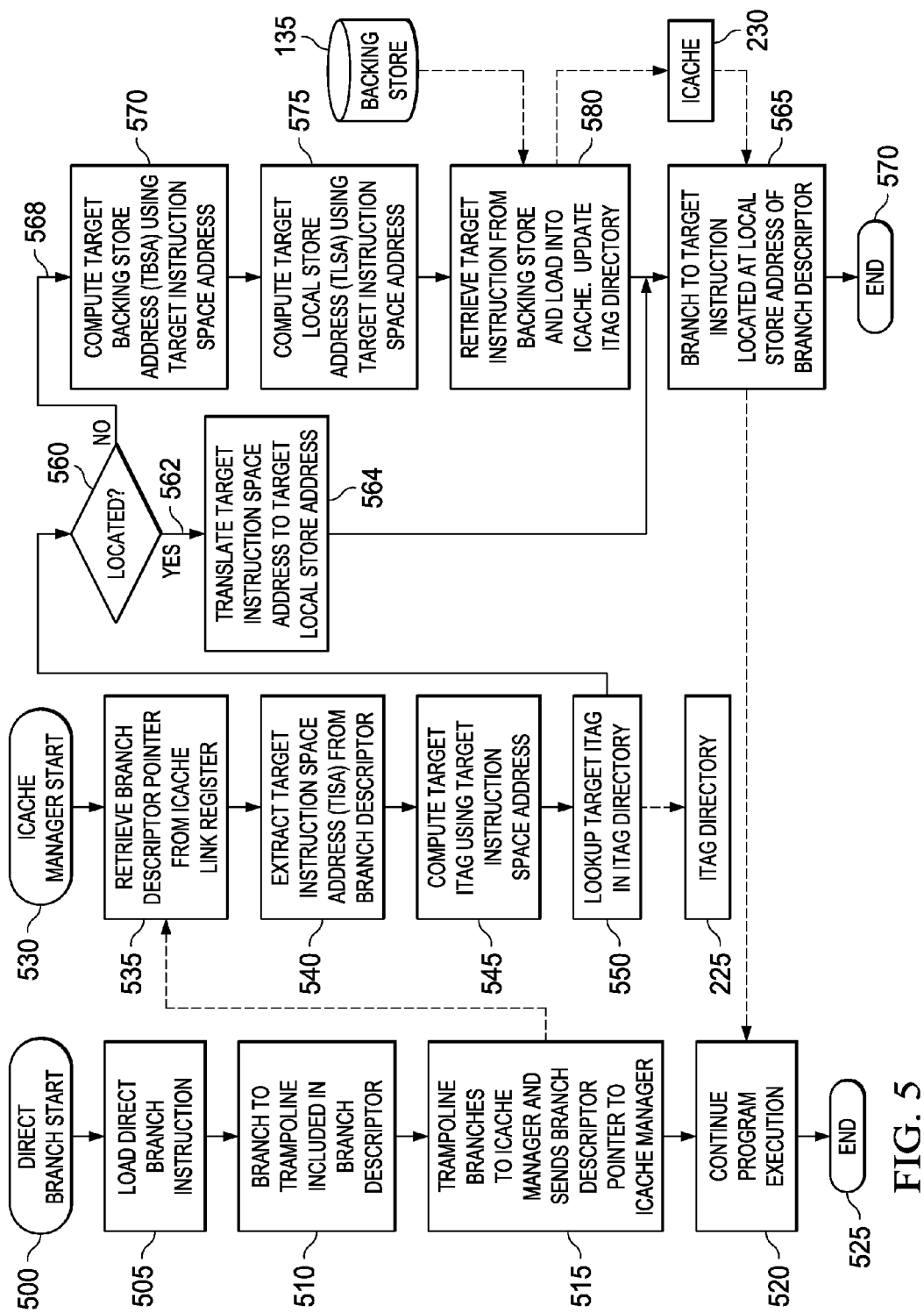
FIG. 5 is a flowchart showing steps taken in executing a direct branch instruction in a runtime environment in accordance with one illustrative embodiment.

FIG. 5 is a flowchart showing steps taken in executing a direct branch instruction in a runtime environment in accordance with one illustrative embodiment. In some of the illustrative embodiments described herein a branch descriptor is inserted into a cache line for each direct branch instruction (see FIG. 4 and corresponding text for further details). In turn, the branch descriptor includes information to pass onto an icache manager to process the direct branch instruction.

Processing commences at 500, whereupon processing (e.g., application thread) loads a direct branch instruction at step 505. The direct branch instruction was arranged at load time to branch to a trampoline branch instruction included in the direct branch's corresponding branch descriptor (see FIG. 3 and corresponding text for further details). As such, at step 510, processing branches to the trampoline branch instruction included in the corresponding branch descriptor. The trampoline branch instruction, at step 515, branches to the icache manager and sends a branch descriptor pointer to the icache manager (e.g., stores the branch descriptor pointer in an icache link register).

Icache manager processing commences at 530, whereupon the icache manager retrieves the branch descriptor pointer from the link register at step 535. At step 540, the icache manager uses the branch descriptor pointer to locate and extract the target instruction space address from the branch descriptor. The target instruction space address is an address that corresponds to the direct branch's target instruction.

At step 545, the icache manager computes a target ITAG from the target instruction space using a tag array mask (see FIG. 8B and corresponding text for further details). Next, the icache manager looks up the target ITAG in ITAG directory 225 in order to determine whether the target instruction is located in icache 230 (step 550).

A determination is made as to whether ITAG directory 225 includes the target ITAG (decision 560). If ITAG directory 225 includes the target ITAG (cache hit), decision 560 branches to "Yes" branch 562 whereupon the icache manager translates the target instruction space address to a target local store address at step 564 by masking off a portion of the target instruction space address (see FIG. 8A and corresponding text for further details). Then, at step 565, the icache manager branches to the target instruction located at the target local store address within icache 230; passes control back to the application thread; and ends at 570. The application thread continues program execution at step 520, and ends at 525.

On the other hand, if ITAG directory 225 fails to include the target ITAG (cache miss), decision 560 branches to "No" branch 568 whereupon processing computes a target backing store address from the target instruction space address using an offset and mask at step 570 (see FIG. 8C and corresponding text for further details). The target backing store address corresponds to the location of the target instruction stored in backing store 135. Next, the icache manager translates the target instruction space address to a target local store address at step 575 by masking off a portion of the target instruction space address (see FIG. 8A and corresponding text for further details). The target local store address is the location in icache 230 that the target instruction is stored. At step 580, the icache manager loads the target instruction from backing store 135 into icache 230. At this point, the icache manager branches to the target instruction located at the target local store address within icache 230 and passes control back to the application thread (step 565), which continues program execution at step 520. Icache manager processing ends at 570 and application thread processing ends at 525.

Figure 6:
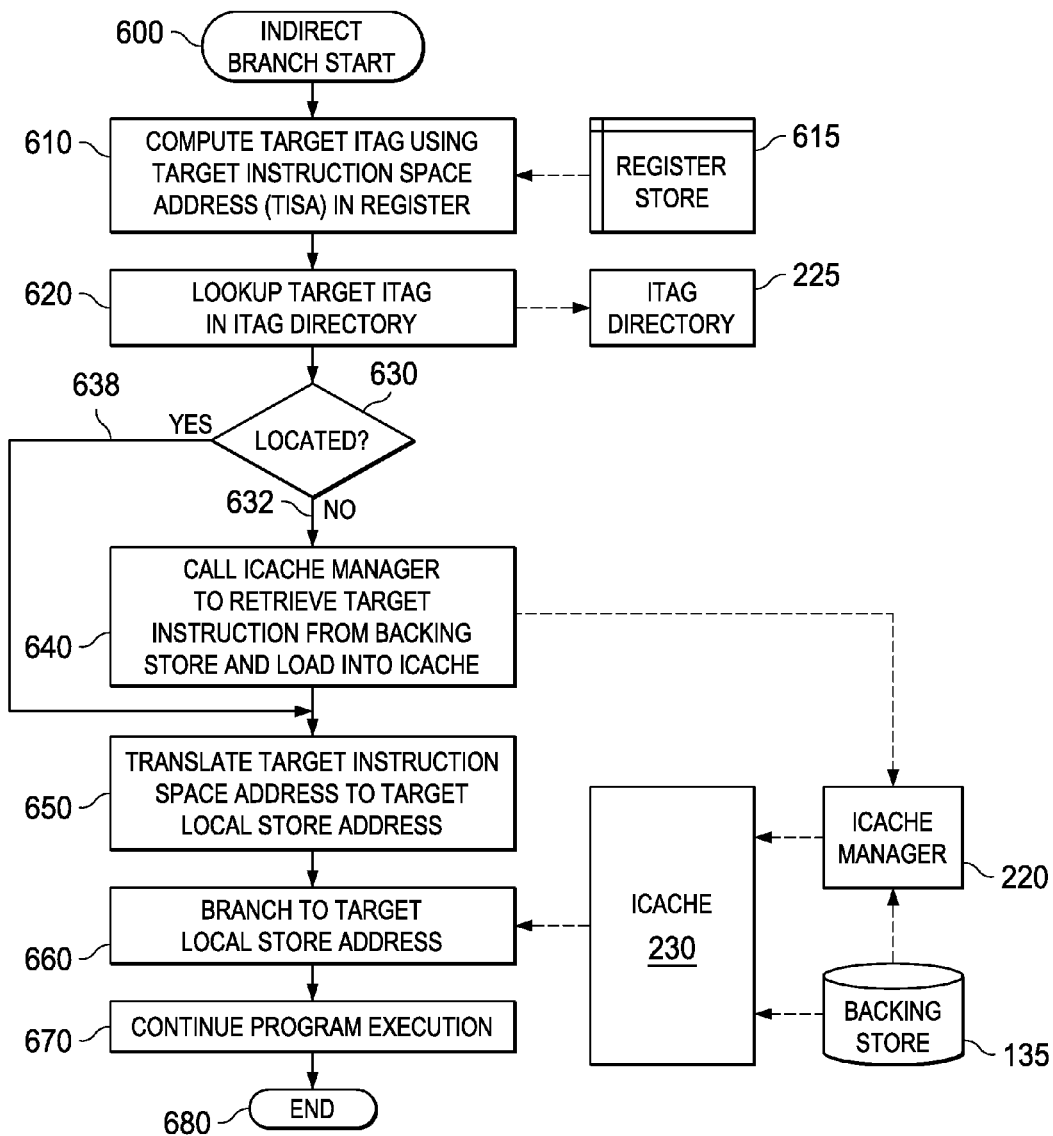
FIG. 6 is a flowchart showing steps taken in executing an indirect branch instruction in a runtime environment in accordance with one illustrative embodiment.

FIG. 6 is a flowchart showing steps taken in executing an indirect branch instruction in a runtime environment in accordance with one illustrative embodiment. Indirect branch processing commences at 600, whereupon processing (e.g., application thread) computes a target instruction tag (ITAG) using a target instruction space address located in register store 615 that corresponds to the indirect branch instruction's target instruction (step 610). The target instruction space address was stored in register store 615 from a previous instruction (hence an indirect branch instruction).

Processing looks up the target ITAG in ITAG directory 225 at step 620, and a determination is made as to whether the lookup results in a cache hit or a cache miss (decision 630). If a cache miss occurs, decision 630 branches to "No" branch 632, whereupon processing calls icache manager 220 to move the target instruction from backing store 135 into icache 230 (step 640). Icache manager 220, in turn, translates the target instruction space address to a target backing store address and a target local store address in order to move the target instruction from backing store 135 into icache 230 (see FIGS. 5, 8A, 8C, and corresponding text for further details). On the other hand, if a cache hit occurs, decision 630 branches to "Yes" branch 638, bypassing icache manager steps.

At step 650, processing translates the target instruction space address to the target local store address and, at step 660, processing retrieves the target instruction from icache 230 at the target local store address. Processing continues program execution at step 670, and ends at 680.

Figure 7:
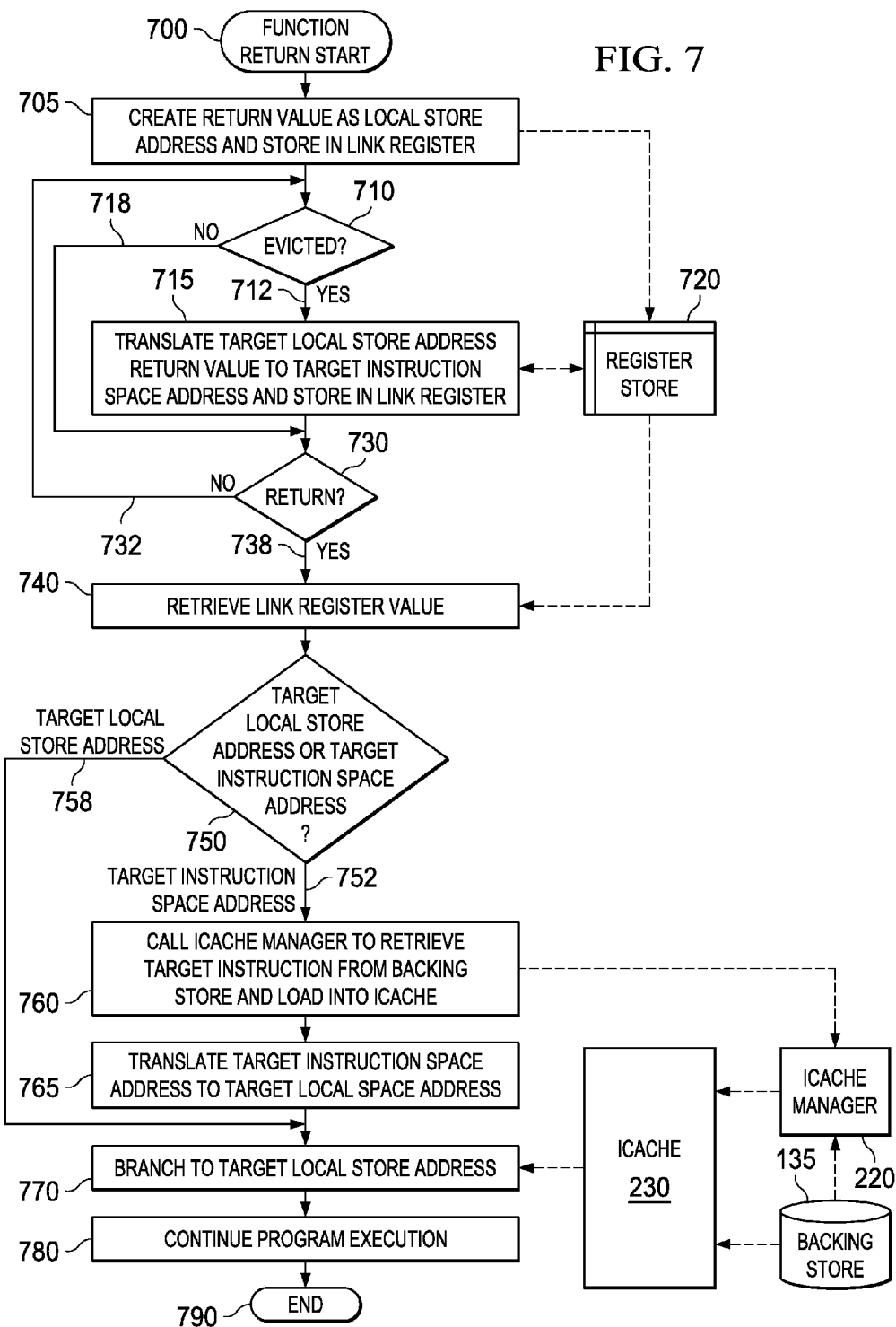
FIG. 7 is a flowchart showing steps taken in executing a function return instruction in a runtime environment in accordance with one illustrative embodiment.

FIG. 7 is a flowchart showing steps taken in executing a function return instruction in a runtime environment in accordance with one illustrative embodiment. Processing commences at 700, whereupon processing executes a function return instruction and, in doing so, creates a target local store address (icache address) as the return value, which is stored in a link register included in register store 720 (step 705).

While waiting for the instruction to finish, a determination is made as to whether the target instruction is being evicted from the icache (decision 710). If the target instruction address is being evicted from the icache, decision 710 branches to "Yes" branch 712, whereupon processing translates the target local store address to a target instruction space address and stores the target instruction space address in the link register at step 715. The target instruction space address is stored in the link register such that when the function return completes, processing realizes that the target instruction is no longer in icache 230 and should call the icache manager to move the target instruction from backing store 135 into icache 230 (discussed below). On the other hand, if the target instruction is not evicted from the icache, decision 710 branches to "No" branch 718 bypassing translation steps.

A determination is made as to whether the function return has completed (decision 730). If the function return has not yet completed, decision 730 branches to "No" branch 732, which loops back to monitor function return completion and target instruction eviction. This looping continues until the function return completes, at which point decision 730 branches to "Yes" branch 738 whereupon processing retrieves the link register value from register store 720 (step 740).

A determination is made as to whether the link register value is a target local store address (TLSA) or a target instruction space address (TISA) (decision 750). If the link register value is a target instruction space address, decision 750 branches to "TISA" branch 752, whereupon processing calls icache manager 220 to move the target instruction from backing store 135 into icache 230 (step 760). Icache manager 220, in turn, translates the target instruction space address to a target backing store address and a target local store address in order to move the target instruction from backing store 135 into icache 230 (see FIGS. 5, 8A, 8C, and corresponding text for further details). Processing, at step 765, converts the target instruction space address to the target local store address. On the other hand, if the link register value is a target local store address (e.g., target instruction was not evicted), decision 750 branches to "TLSA" branch 758 bypassing icache manager calling steps.

At step 770, processing branches to the target address at the target local store address and continues program execution at step 780. Processing ends at 790.

FIG. 8A shows a target instruction space address translated into a target local store address in accordance with one illustrative embodiment. The target instruction space address discussed herein includes 32 bits and the target local store address discussed herein includes 18 bits. As those skilled in the art can appreciate, more or less bits may be used for the target instruction space address and/or the target local store address. The target instruction space address includes the target local store address in its 18 least significant bits (see FIG. 2 and corresponding text for further details). As such, in order to translate the target instruction space address to the target local store address, the icache manager masks off target instruction space address 800's 14 most significant bits using mask 810, which leaves 18 least significant bits as target local store address 820.

FIG. 8B is a flowchart showing steps taken in an icache manager translating a target instruction space address to a target instruction tag (ITAG) in accordance with one illustrative embodiment. Icache manager processing commences at 830, whereupon the icache manager generates an instruction tag index using the target instruction space effective address and a tag array mask (step 840). In one embodiment, a tag array is an array of structures with one element per cache line. Each element includes an instruction space address of a corresponding line that is currently resident. As such, in this embodiment:

tag array mask=Number of cache lines−1

ITAG index=(TISA/linesize)& tag mask

Next, at step 850, the icache manager generates the target instruction tag at step 850 from the generated ITAG index, such as by using the instruction:

Target ITAG=tag[ITAG index]

The icache manager may then use the target ITAG to look in the ITAG directory and determine whether a corresponding target instruction is located in the icache or whether the icache manager should retrieve the target instruction from backing store and load it into the icache. Processing ends at 860

FIG. 8C is a flowchart showing steps taken in an icache manager translating a target instruction space address to a target backing store address. Icache manager processing commences at 870, whereupon the icache manager generates an offset using the target instruction space address (TISA) and icache base address (step 880), such as with the instruction:

offset=(TISA−icachebase)

Next, at step 890, the icache manager generates the target backing store address (TBSA) using the generated offset and mask that preserves an index into a cache array, such as with the instruction:

TBSA=(offset&mask that preserves idx into cache array)|(offset>>(18−log 2 icachesize))

where "&" is a bitwise AND operator; "|" is a bitwise OR operator; and ">>" is a bitwise right shift. The icache manager may then use the target backing store address to retrieve the target instruction from backing store at the target backing store address, and load the target instruction into the icache (see FIGS. 5-7 and corresponding text for further details). Processing ends at 895.

FIG. 9 illustrates information handling system 900, which is another embodiment of a simplified example of a computer system capable of performing the computing operations described herein. Information handling system 900 includes one or more processors 910 coupled to processor interface bus 912. Processor interface bus 912 connects processors 910 to Northbridge 915, which is also known as the Memory Controller Hub (MCH). Northbridge 915 connects to system memory 920 and provides a means for processor(s) 910 to access the system memory. Graphics controller 925 also connects to Northbridge 915. In one embodiment, PCI Express bus 918 connects Northbridge 915 to graphics controller 925. Graphics controller 925 connects to display device 930, such as a computer monitor.

Northbridge 915 and Southbridge 935 connect to each other using bus 919. In one embodiment, the bus is a Direct Media Interface (DMI) bus that transfers data at high speeds in each direction between Northbridge 915 and Southbridge 935. In another embodiment, a Peripheral Component Interconnect (PCI) bus connects the Northbridge and the Southbridge. Southbridge 935, also known as the I/O Controller Hub (ICH) is a chip that generally implements capabilities that operate at slower speeds than the capabilities provided by the Northbridge. Southbridge 935 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 996 and "legacy" I/O devices (using a "super I/O" chip). The "legacy" I/O devices (998) can include, for example, serial and parallel ports, keyboard, mouse, and/or a floppy disk controller. The LPC bus also connects Southbridge 935 to Trusted Platform Module (TPM) 995. Other components often included in Southbridge 935 include a Direct Memory Access (DMA) controller, a Programmable Interrupt Controller (PIC), and a storage device controller, which connects Southbridge 935 to nonvolatile storage device 985, such as a hard disk drive, using bus 984.

ExpressCard 955 is a slot that connects hot-pluggable devices to the information handling system. ExpressCard 955 supports both PCI Express and USB connectivity as it connects to Southbridge 935 using both the Universal Serial Bus (USB) the PCI Express bus. Southbridge 935 includes USB Controller 940 that provides USB connectivity to devices that connect to the USB. These devices include webcam (camera) 950, infrared (IR) receiver 948, keyboard and trackpad 944, and Bluetooth device 946, which provides for wireless personal area networks (PANs). USB Controller 940 also provides USB connectivity to other miscellaneous USB connected devices 942, such as a mouse, removable nonvolatile storage device 945, modems, network cards, ISDN connectors, fax, printers, USB hubs, and many other types of USB connected devices. While removable nonvolatile storage device 945 is shown as a USB-connected device, removable nonvolatile storage device 945 could be connected using a different interface, such as a Firewire interface, etcetera.

Wireless Local Area Network (LAN) device 975 connects to Southbridge 935 via the PCI or PCI Express bus 972. LAN device 975 typically implements one of the IEEE 802.11 standards of over-the-air modulation techniques that all use the same protocol to wireless communicate between information handling system 900 and another computer system or device. Optical storage device 990 connects to Southbridge 935 using Serial ATA (SATA) bus 988. Serial ATA adapters and devices communicate over a high-speed serial link. The Serial ATA bus also connects Southbridge 935 to other forms of storage devices, such as hard disk drives. Audio circuitry 960, such as a sound card, connects to Southbridge 935 via bus 958. Audio circuitry 960 also provides functionality such as audio line-in and optical digital audio in port 962, optical digital output and headphone jack 964, internal speakers 966, and internal microphone 968. Ethernet controller 970 connects to Southbridge 935 using a bus, such as the PCI or PCI Express bus. Ethernet controller 970 connects information handling system 900 to a computer network, such as a Local Area Network (LAN), the Internet, and other public and private computer networks.

The above mechanisms provide the ability for code to jump, through the use of a trampoline instruction, to the instruction cache manager of the instruction cache to check whether the target code for a branch instruction is in the instruction cache or not. If not, the instruction cache manager will bring the target code into the cache. The instruction cache manager will then cause the execution to jump to where the target code is present in the instruction cache. This allows code segments to be brought from a backing store, or main memory, of the system into a local store or instruction cache associated with a processor. This mechanism may be replicated with each processor of a multi-processor system such that each processor may manage the moving of instructions into and out of the local stores or instruction caches associated with the individual processors.

While this mechanism generally works well, further performance enhancement and optimization may be achieved by providing mechanisms to avoid the overhead of redirecting execution to the instruction cache manager, having the instruction cache manager perform its checks and operations, and then returning to the original code. The mechanisms of the illustrative embodiments provide further functionality to dynamically rewrite branch instructions utilizing branch stubs, i.e. small portions of code that stand in for, or replace, another programming function. The branch stubs maintain information about branch instructions and serve as a mechanism for jumping directly to target code in the instruction cache when possible. The branch stub code serves a similar purpose as the trampoline code with the exception that the overhead of the instruction cache manager is avoided when the target code exists within the instruction cache. In the case that the target code is not in the instruction cache, the execution of the code may be redirected to the instruction cache manager as previously described above. These mechanisms may be implemented in an information handling system, such as described above with reference to FIG. 9, or other type of information/data processing system.

The branch stubs are introduced into the code, such as at the end of a code block (a section of code grouped together, typically having a size that is able to fit into one or more cache lines of an instruction cache), by a compiler at compile time and may be dynamically updated at runtime by an instruction cache runtime system. The instruction cache runtime system is the collection of software designed to support the execution of computer programs, which may include subroutines and libraries for common operations, implementation of programming language commands, type checking, debugging, code generation and optimization, and the like. In particular, the instruction cache runtime system includes an instruction cache manager, such as that previously described above, which has been modified to make use of the additional mechanisms described in the further illustrative embodiments hereafter. The original branch instruction is rewritten by the compiler to branch to an address corresponding to the branch stub for this branch instruction and the modified branch instruction and branch stub are included in the executable code so that it can be brought into the instruction cache along with the other instructions. Again, branch instructions may be function calls, conditional branch instructions, unconditional branch instructions, or the like, and may be direct branch instructions or indirect branch instructions.

With direct branch instructions, i.e. branch instructions for which an address of a next instruction to execute is explicitly specified in the branch instruction, the branch stubs can be used to store a branch offset, i.e. an offset from the address of the branch instruction, that is used to locate the original target address of the next instruction to execute and thus, the target is explicitly identified. During runtime, after the instruction cache line corresponding to the branch instruction is fetched, the direct branch instruction can be rewritten so that it targets the address of the actual target inside the instruction cache, rather than the address of the branch stub. In this way, further executions of the direct branch instruction will proceed directly to the target address of the next instruction directly without incurring instruction cache runtime system overhead, i.e. the overhead associated with jumping to the instruction cache manager of the instruction cache runtime system.

Indirect branch instructions cannot be rewritten in the same manner as direct branch instructions using the branch stubs since the targets of indirect branch instructions are only known at runtime and may be different each time the indirect branch instructions are executed. Thus, the overhead associated with having to go to the instruction cache runtime system can only be avoided if it can be determined that the current target of the indirect branch instruction is already in the instruction cache. The illustrative embodiments provide mechanisms for determining whether the target of an indirect branch instruction is in the instruction cache or not so that a direct jump can be made using the branch stub.

With indirect branch instructions, the instruction cache runtime system may monitor the execution of code to identify these indirect branch instructions and may determine the target of the indirect branch instruction and whether the target of the indirect branch instruction is the same target as in a previous execution of the indirect branch instruction. The branch stubs for indirect branch instructions, along with a compiler inserted check instruction, can be used to make such a determination, as will be described in greater detail hereafter. If the indirect branch instruction is targeting the same target address as for a previous execution of the indirect branch instruction, then the execution may jump directly to this target in the instruction cache without having to go through the instruction cache runtime system, e.g., the instruction cache manager. However, if the target address of the indirect branch instruction does not match a previous target address for a previous execution of the branch instruction, then the execution may jump to the instruction cache runtime system, such as the instruction cache manager as described above, to bring the target of the indirect branch instruction into the instruction cache.

As mentioned above, one aspect of these illustrative embodiments is the introduction of branch stubs for branch instructions in code provided to a compiler. The compiler may analyze the received code, identify branch instructions in the code as well as whether the branch instruction is a direct branch instruction or an indirect branch instruction. For example, the compiler may identify a branch instruction as a direct branch instruction when the target of the branch instruction is a discernable address at compile time. A branch instruction whose target is a register or some other location whose contents are dynamically determined at runtime, will be identified by the compiler as an indirect branch instruction.

For direct and indirect branch instructions, the compiler generates a branch stub, inserts a link to the instruction cache manager into a first portion of the branch stub, and a copy of the target address from the original branch instruction in a second portion of the branch stub. The original branch instruction is then rewritten to reference the branch stub, i.e. the target of the original branch instruction is changed to an address or offset to the branch stub for that branch instruction to thereby generate a modified branch instruction. For indirect branch instructions, the compiler further inserts a check instruction, such as prior to the branch instruction, to check whether a target of the branch instruction matches a previous target of the same branch instruction and to jump to one of the target instruction or the instruction cache runtime system based on an outcome of the check. This will be described in greater detail hereafter.

Figure 10:
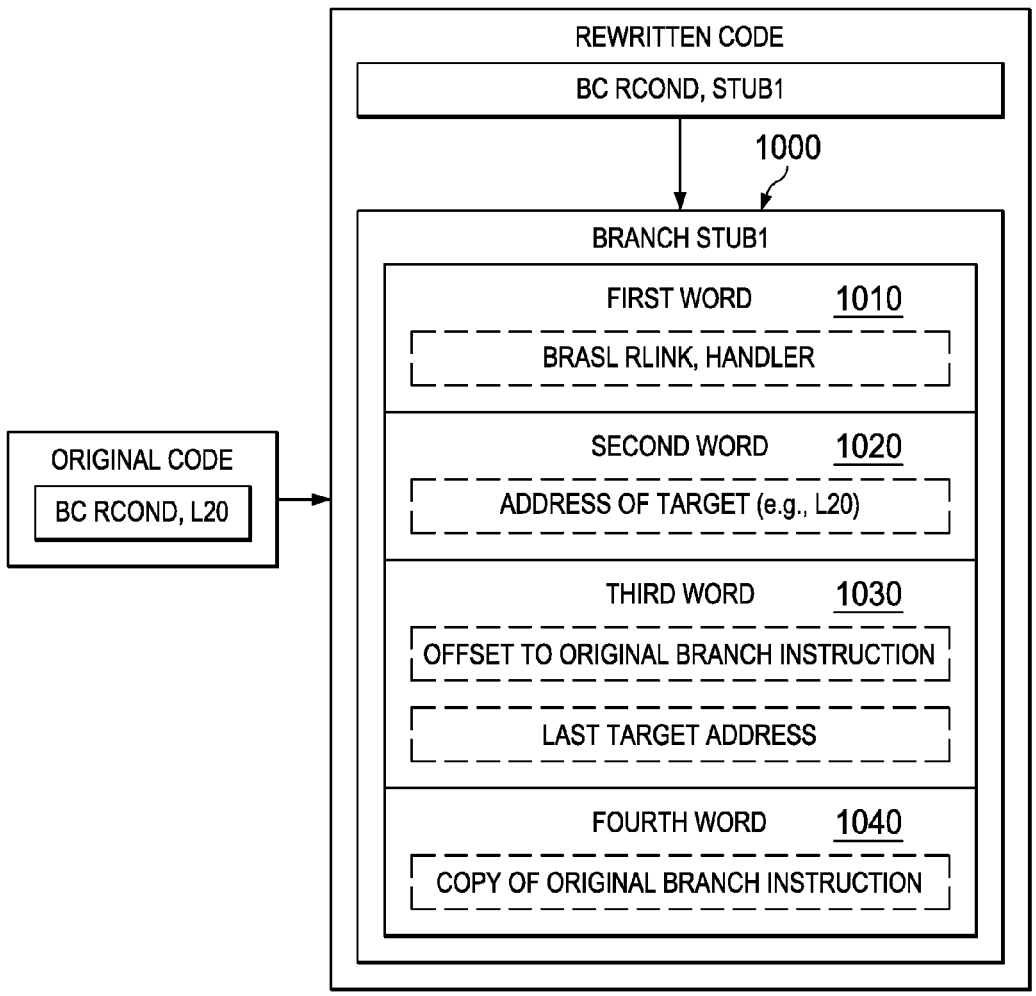
FIG. 10 is an example diagram of a branch stub in accordance with one illustrative embodiment.

FIG. 10 is an example diagram of a branch stub in accordance with one illustrative embodiment. As shown in FIG. 10, in one illustrative embodiment, the branch stub 1000 comprises a plurality of portions of data 1010-1040 with each portion of data 1010-1040 storing different information based on the type of branch instruction that is replaced by the branch stub 1000. In the depicted example, the branch stub 1000 is comprised of four words 1010-1040, with each word being a fixed size number of bits of data. In general the first portion 1010 of the branch stub 1000, e.g., the first word, is used for storing an address to link register and a cache miss handler in the first portion 1010, which may be the instruction cache manager, may be part of the instruction cache manager, or may otherwise be provided by the instruction cache runtime system, for example, in case the target of the branch is not present in the instruction cache when the branch stub is processed. The second portion 1020 may store a copy of the target effective address from the original branch instruction. The last two portions 1030 and 1040, e.g., the last two words, are free to be used by the instruction cache runtime system to store information about runtime status of the branch instructions that are rewritten using the branch stub 1000 based on the type of branch instruction being replaced or rewritten.

For example, the third portion 1030 of the branch stub 1000 may be used by the instruction cache runtime system, for direct branch instructions, to store an offset into a cache line or cache line for locating the original branch instruction. The fourth portion 1040 of the branch stub 1000 may be used to store a copy of the original branch instruction before rewriting. With this extra information in the branch stub 1000, after the instruction cache manager fetches the instruction cache line corresponding to the branch instruction into the instruction cache, the instruction cache manager may cause the direct branch instruction to be rewritten to target the actual target address inside the instruction cache rather than the branch stub 1000. Thereafter, when the direct branch instruction is again executed, the branch instruction will jump directly to the target in the instruction cache rather than having to go through the instruction cache manager to check to see if the target is in the instruction cache.

For indirect branch instructions, the mechanisms of the illustrative embodiments make use of the observation that indirect branch instructions tend to target the same target address at runtime. Thus, for indirect branch instructions, the instruction cache runtime system uses a sub-portion of the third portion 1030 of the branch stub 1000, which is unused for direct branch instructions, to store the target address for the last target called by the indirect branch instruction. This target address for the last target called by the indirect branch instruction, stored in sub-portion of the third portion 1030 of the branch stub 1000, may be used by the check instruction inserted by the compiler to check to see if the previous execution of the indirect branch instruction targeted the same target address or not as the current execution of the indirect branch instruction. If so, then the target instruction is already present in the instruction cache (since the previous execution used it) and thus, the indirect branch instruction can jump directly to the target instruction in the instruction cache without having to go through the instruction cache manager. If the target address for the last target called by the indirect branch instruction does not match the target of the current execution of the indirect branch instruction, then the execution jumps to the instruction cache manager to perform the necessary operations for bringing the target into the instruction cache, as previously described above.

It should be noted that in order to handle cache line eviction properly, such as when there is an instruction cache miss and a cache line needs to be evicted to bring in another cache line, the saved target address in the sub-portion of the third portion 1030 of the branch stub 1000 of the calling indirect branch instruction needs to be cleared when the target instruction is evicted from the instruction cache. The same is true for direct branches such that the target address information stored in the branch stub 1000 must be cleared when the target instruction is evicted from the instruction cache. More about eviction will be provided hereafter.

In addition to the above, the illustrative embodiments further include mechanisms for rewriting branch instruction returns. Branch instruction return rewriting, in accordance with one illustrative embodiment, is achieved without using branch stubs but instead makes use of a rewriting of a link register. For example with a processor element architecture such as shown in FIG. 1, each SPE may support 128 bit registers, each of which may store a quadword. Register r0 may be used as a link register, i.e. a register that stores the address to return to when a function completes execution, with only word 0 of the link register typically being used. In general, when a function returns, the address stored in the link register is loaded from the call stack and then a return handler, which may be part of the instruction cache manager, or otherwise provided in the instruction cache runtime system, is called with the link register address as input. The return handler would then check whether the code block to return to is still in the instruction cache or not, and if not, it will fetch the code block from the backing store or main memory and put it into the instruction cache.

Figure 11:
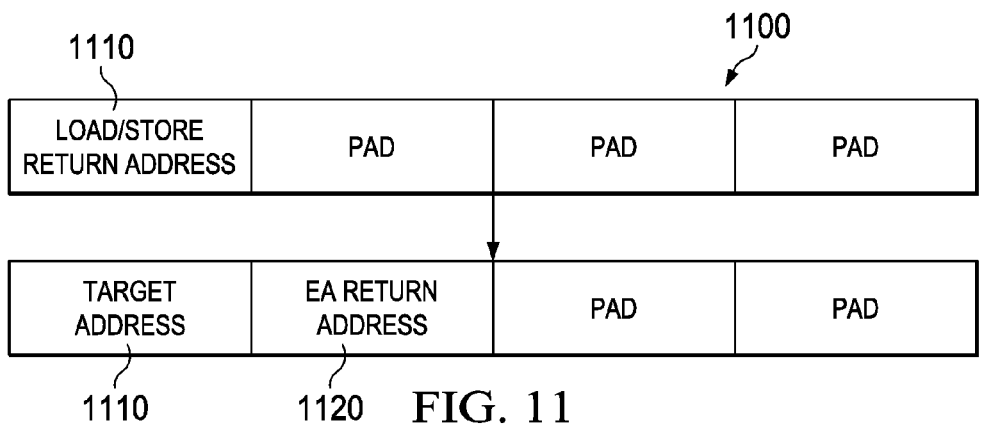
FIG. 11 is an example diagram illustrating a rewriting of a link register in accordance with one illustrative embodiment.

FIG. 11 is an example diagram illustrating a rewriting of a link register in accordance with one illustrative embodiment. As shown in FIG. 11, the mechanisms of the illustrative embodiments rewrite the link register 1100 so that additional information is stored in the link register 1100. That is, typically the link register 1100 only stores the return address, referred to as the load/store return address, in word 0 1110 of the link register 1100. However, with the mechanisms of the illustrative embodiments, the instruction cache runtime system rewrites the link register 1100 to store a target address in word 0 1110, which is to be used as a basis for an indirect branch instruction to the target address, and an effective address (EA) for the return address in word 1 1120.

With this rewriting of the link register 1100, when a branch returns, the instruction cache runtime system can perform a load of the link register from the stack and perform an indirect branch to the link register. The target of the indirect branch instruction to the link register will be word 0 of the link register. This indirect branch instruction can then be handled using the mechanisms noted above with regard to indirect branches. As a result, if the target address stored in word 0 of the link register corresponds to the same target address as a previous execution of the indirect branch, as determined from a branch stub associated with the indirect branch instruction, then the execution of the code can bypass the return handler of the instruction cache runtime system and jump directly to the target instruction in the instruction cache. If the target addresses do not match, then the instruction cache manager may be invoked as discussed above.

In particular, after instruction cache miss handling, which may occur as a result of a target of the branch instruction, e.g., a called function, not being present in the instruction cache, the return handler of the instruction cache runtime system, e.g., in the instruction cache manager, stores the instruction cache address of the code block to return to in the first slot or word, e.g., word 0 1110, of the link register 1100. The return handler also stores the corresponding effective address of the instruction cache address of the code block to return to in a second slot or word, e.g., word 1 1120, of the link register 1100. Thus, after rewriting the link register, and assuming that the target block of code is not evicted, when the branch returns, it will branch to the first slot or word, e.g., word 0 1110, of the link register 1100 directly without invoking the return handler of the instruction cache runtime system.

It should be noted that cache eviction needs to be handled carefully in this case. To correct return rewriting when the target block of code to be returned to has been evicted from the instruction cache, whenever a cache line is evicted, the instruction cache manager may traverse all call stack frames through a back chain. For each call stack frame, the instruction cache manager may examine the second slot or word, e.g., word 1 1120, of the link register 1100. If the effective address in the second slot or word matches the cache line evicted, then the instruction cache manager may modify the first slot or word, e.g., word 0 1110, of the link register 1100 to point to the address of the return handler of the instruction cache runtime system. Thus, later, when the branch instruction returns, the return handler will be invoked instead, and the return handler knows which cache line to fetch based on the second slot or word, e.g., word 1 1120, of the link register 1100.

Figure 12:
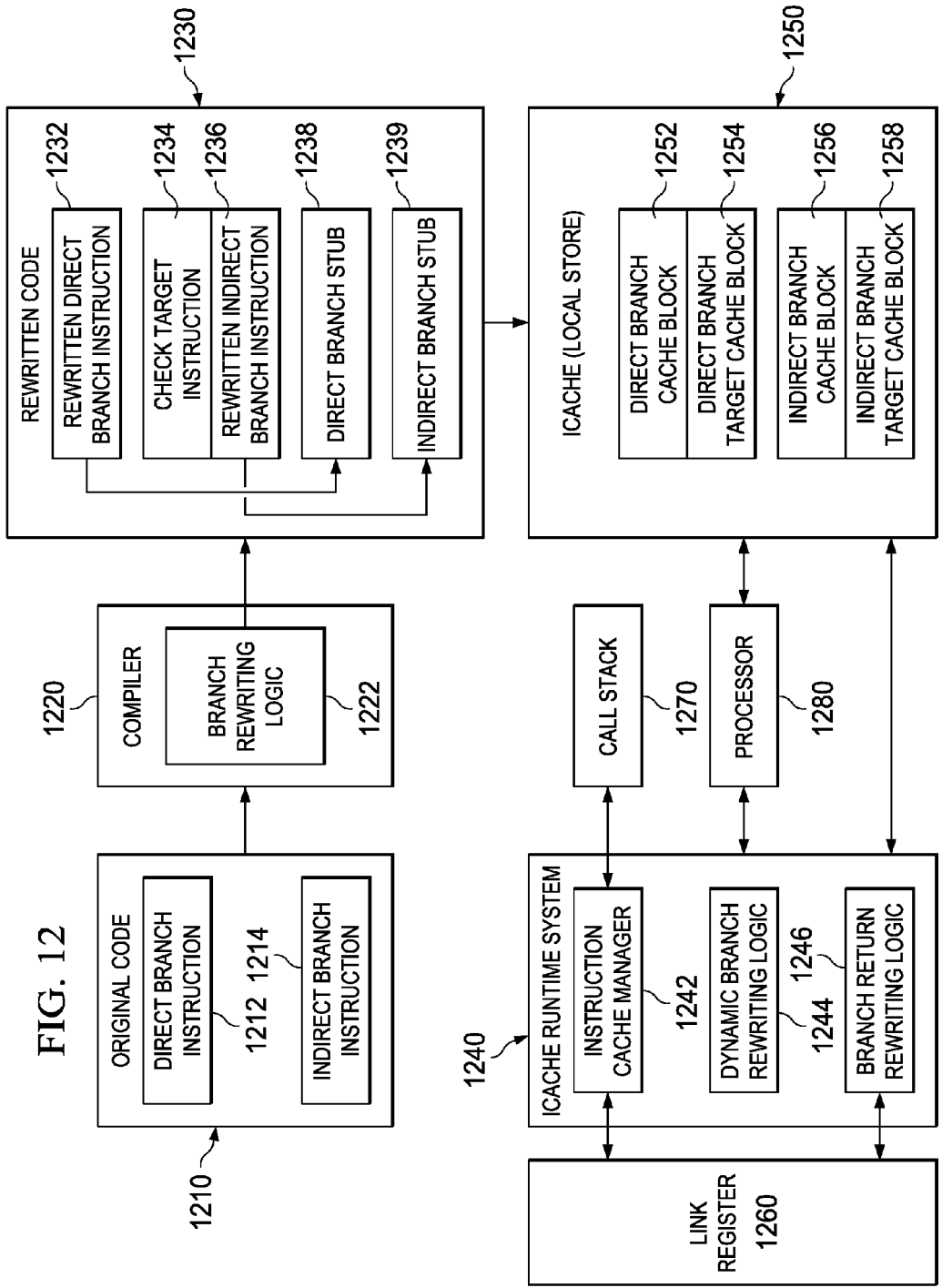
FIG. 12 is an example diagram illustrating an overall operation of one illustrative embodiment for rewriting branch instructions using branch stubs.

FIG. 12 is an example diagram illustrating an overall operation of one illustrative embodiment for rewriting branch instructions using branch stubs. As shown in FIG. 12, original code 1210 is provided and may include one or more direct branch instructions 1212 and/or one or more indirect branch instructions 1214. The compiler 1220 may receive the original code 1210 and, as part of its optimizations, may rewrite the branches in the original code 1210 using branch stubs with the branch instructions referencing the branch stubs. In order to achieve this rewriting, the compiler 1220 may be provided with branch rewriting logic 1222 that performs the static analysis of the original code 1210 as described previously to identify branches in the original code 1210 and rewrite these branches accordingly.

For example, the branch rewriting logic 1222 may identify the branches in the original code 1210, generate a branch stub, e.g., branch stubs 1238 and 1239, for each of the branches in the original code 1210, and populate the branch stubs with an address for the instruction cache manager (for use in the case of a target block not being present in the instruction cache), as well as an original target address from the original branch instruction. The original branch instructions are then rewritten to replace the reference to the target instruction with a reference to the branch stub corresponding to the branch instruction. This is done regardless of whether the branch instruction is a direct branch instruction or an indirect branch instruction. As a result, the rewritten code 1230 includes rewritten branch instructions 1232 and 1236 as well as branch stubs 1238 and 1239 with a linking between the rewritten branch instructions and their corresponding branch stubs (represented by the arrows in FIG. 12).

The branch rewriting logic 1222 further determines which branch instructions in the original code 1210 are direct branch instructions 1212 or indirect branch instructions 1214. For indirect branch instructions 1214, the branch rewriting logic 1222 inserts check target instructions, such as check target instruction 1234. As discussed above, these check target instructions 1234, at runtime, cause a check to be performed of the target address of the current execution of an indirect branch instruction with a target address of a last previous execution of the indirect branch instruction to see if there is a match between the two. If there is a match, then the execution jumps to the target address directly without having to go to the instruction cache (icache)

runtime system 1240. If there is not a match, then the execution goes to the icache runtime system 1240 so that an instruction cache manager 1242 may perform the necessary operations to ensure that the block of code targeted by the indirect branch instruction is brought into the instruction cache (icache) 1250.

The rewritten code 1230 may be provided to a linker (not shown) which then links the code with library functions and the like, and generates executable code that is provided to processor 1280. The processor 1280 may execute the rewritten code 1230 and, in the process execute the rewritten branch instructions 1232 and 1236 using the corresponding branch stubs 1238 and 1239. As part of the execution of these instructions, the icache runtime system 1240 may monitor the execution to determine when the branch instructions need to be dynamically rewritten. For example, with direct branch instructions, such as direct branch instruction 1232, the dynamic branch rewriting logic 1244 of the icache runtime system 1240 rewrites the direct branch instruction 1232 dynamically to directly target the location 1254 within the instruction cache 1250 where the target of the original branch instruction is currently located, rather than pointing to the branch stub 1238. This dynamic rewriting is performed to the direct branch instruction in the direct branch cache line 1252 in the icache 1250.

With indirect branch instructions, such as indirect branch instruction 1236, the dynamic branch rewriting logic 1244 monitors whether the corresponding check target instruction 1234 results in the target addresses matching or not. If the target addresses match, then the processor may access the indirect branch target cache line 1258 directly without having to go through the instruction cache manager 1242 of the icache runtime system 1240. If the target addresses do not match, then the execution branches to the instruction cache manager 1242 of the instruction cache runtime system 1240, as specified by the first portion of the branch stub. In addition, the dynamic branch rewriting logic 1244 rewrites the indirect branch stub 1239, in the indirect branch cache line 1256, with the current target address of the current execution of the indirect branch instruction 1236, such as in a sub-portion of the third word 1030 in FIG. 10. In this way, the target address stored in the indirect branch stub in the indirect branch cache line 1256 is updated to store the last previous target address of the indirect branch instruction.

In addition to the above, the branch return rewriting logic 1246 of the icache runtime system 1240 operates to rewrite the link register 1260 so that it stores the target address and effective address of the target address in the link register as discussed above with regard to FIG. 11. When a branch instruction returns, it returns to the target address in the link register using an indirect branch instruction that is handled in the same manner as other indirect branch instructions discussed above. In addition, the instruction cache manager 1242 may perform the operations noted above using the call stack 1270 to traverse call stack frames to determine if there is a match to the effective address of the link register 1260 and if so, cause the branch return rewriting logic to rewrite the target address in the link register 1260 to point to the instruction cache manager 1242.

Figure 13:
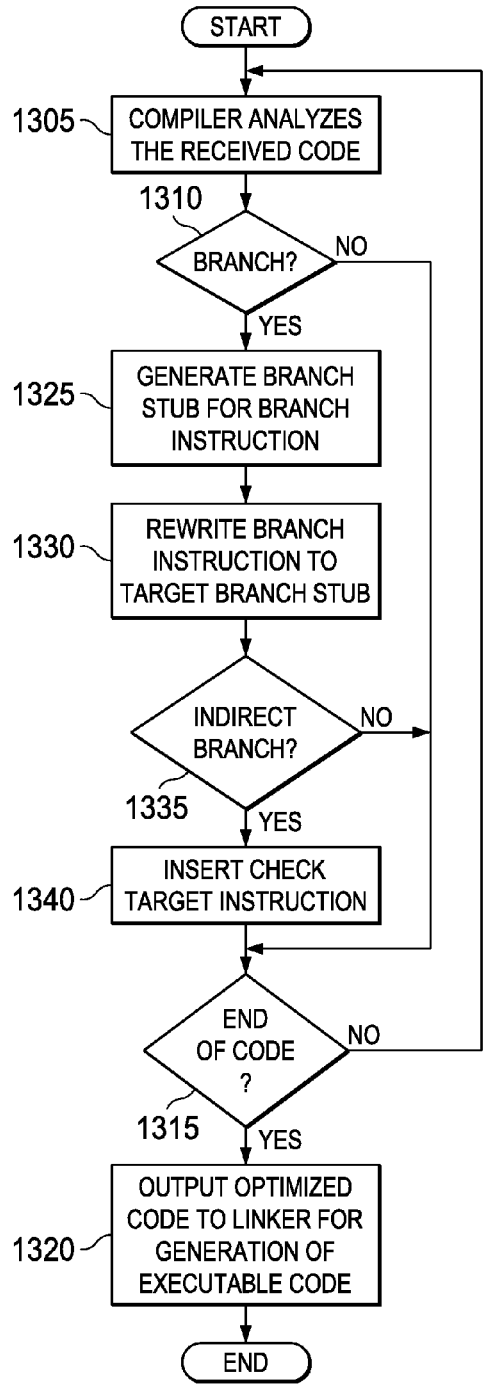
FIG. 13 is a flowchart outlining an example operation of a compiler for rewriting branch instructions in accordance with one illustrative embodiment.

FIG. 13 is a flowchart outlining an example operation of a compiler for rewriting branch instructions in accordance with one illustrative embodiment. As shown in FIG. 13, the operation starts with the compiler analyzing the received code (step 1305) and determining if a branch instruction is encountered (step 1310). If a branch instruction is not encountered, the operation determines if an end of the code is encountered (step 1315). If not, the operation returns to step 1305. Otherwise the optimized code is output to the linker for generation of executable code (step 1320) and the operation terminates.

If the compiler encounters a branch instruction (step 1310), the compiler generates a branch stub for the branch instruction including storing the address to the instruction cache manager and the original target address of the branch instruction as described above (step 1325). The compiler rewrites the branch instruction to target the branch stub (step 1330) and determines if the branch instruction is an indirect branch instruction (step 1335). If the branch is an indirect branch instruction, the compiler inserts a check target instruction prior to the branch instruction that checks the target of the indirect branch instruction against a last previous target address stored in the branch stub and jumps directly to the target if there is a match or jumps to the instruction cache manager if there is not a match (step 1340). Thereafter, or if the branch instruction is not an indirect branch instruction, the operation continues to step 1315.

Figure 14:
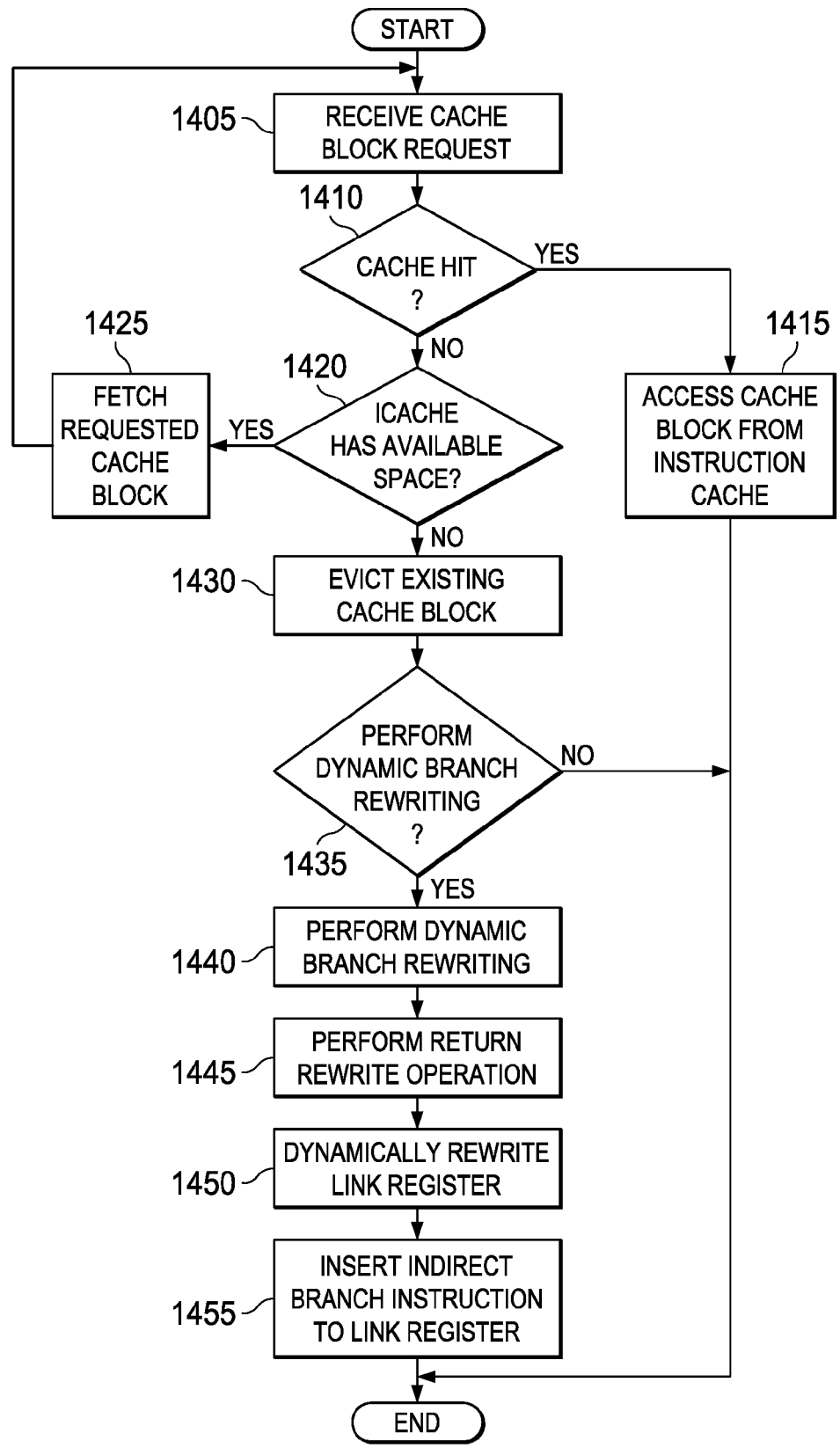
FIG. 14 is a flowchart outlining an example operation or an instruction cache runtime system for performing dynamic rewriting of branch instructions in accordance with one illustrative embodiment.

FIG. 14 is a flowchart outlining an example operation or an instruction cache runtime system for performing dynamic rewriting of branch instructions in accordance with one illustrative embodiment. As shown in FIG. 14, the operation starts by receiving a cache line request requesting an access to a particular portion of code in a cache line of the instruction cache (step 1405). A determination is made as to whether there is a cache hit or not, i.e. the cache line corresponding to the cache line request is already present in the instruction cache (step 1410). If there is a cache hit, then the cache line is accessed from the instruction cache (step 1415) and the operation terminates. If there is not a cache hit, i.e. there is a cache miss, then a determination is made as to whether the instruction cache has available unused space to store a cache line corresponding to the cache line request (step 1420). If there is available space, then the requested cache line is fetched from the backing store and loaded into the instruction cache (step 1425), with the operation returning to step 1405 where the cache line request is again executed.

If there is not available space in the instruction cache, an existing cache line is evicted (step 1430) and a determination is made as to whether dynamic branch rewriting is to be performed (step 1435). If dynamic branch rewriting is not to be performed, the operation continues to step 1425. The determination as to whether to perform dynamic branch rewriting may include, for example, determining if a branch instruction loaded with the cache line targeted by the cache line request is a direct branch or an indirect branch. If the branch is a direct branch, then the branch instruction can be dynamically rewritten to directly reference the location of the original target instruction in the instruction cache rather than referencing the branch stub of the direct branch. If the branch is an indirect branch, then a check instruction may be executed to determine if the target of the indirect branch is the same as a last previous target as stored in the branch stub. If there is a match, then the branch instruction can jump directly to the target in the instruction cache. If there is not a match, then the execution may branch to the instruction branch manager and the current target may be stored in the branch stub in replacement of the last previous target address.

If dynamic branch rewriting is to be performed, then the dynamic branch rewriting is performed as discussed above (step 1440). A return rewrite operation may then be performed for the evicted cache line based on the effective address of the target stored in the link register, as previously described above (step 1445). The link register may then be dynamically rewritten (step 1450). As noted above, the link register may be rewritten to include the target address and the effective address of the target. An indirect branch instruction to the target address stored in the link register may be inserted at the branch return (step 1455). The operation then terminates.

Thus, the illustrative embodiments provide a mechanism for using a branch stub and runtime logic to bypass the instruction cache manager in instances where it can be determined that the target of the branch instruction is already present in the instruction cache. Moreover, the mechanisms of the illustrative embodiments provide a functionality for rewriting a link register so that upon a return from executing a branch instruction, an indirect branch to a target specified in the link register, or the instruction cache manager is made possible.

These mechanisms improve the performance of a software managed instruction cache by rewriting a jump to the software instruction cache runtime system as a direct jump to the target location in the software cache. However, when a cache line or block is evicted from the instruction cache, all jumps directly going to this cache line or cache line need to be restored to their original targets so that, if necessary, the jumps can be made to the instruction cache runtime system in the event that the target is not in the instruction cache. This is because, if these jumps to the targets are not restored, the jumps may be made to a wrong target since the correct target is no longer in the instruction cache.

The unchaining process, i.e. retracing the jump instructions from one cache line to another in the instruction cache to identify source cache lines, i.e. the cache line from which a branch or call to a cache line of interest, or target cache line, is especially challenging when the source cache lines are only known at runtime, such as with indirect branch instructions or function calls. One mechanism for handling this situation is to flush the entire instruction cache or utilize expensive bookkeeping and table lookup algorithms which result in significant overhead and lose the opportunity for reuse of the cache line, i.e. if the instruction cache is flushed and all cache lines are evicted, then the cache lines that were brought into the instruction cache cannot be used again.

The illustrative embodiments provide additional mechanisms for handling cache eviction in which branch instructions have been rewritten to directly target cache lines that are to be evicted. With these mechanisms, the possible source cache lines of a cache line of interest, hereafter referred to as the target cache line, are dynamically maintained in a doubly linked list. When the target cache line is to be evicted, the linked list is scanned to restore the chained jump branch instructions. In this way, the mechanisms of the illustrative embodiments support efficient eviction via a doubly linked list of cross inter-cache line branches who's branch targets are in a particular cache line, and a singly linked list of inter-cache line branches within a particular cache line that have been put into the doubly linked lists of the other cache lines. Moreover, the mechanisms of the illustrative embodiments support a partial stack scan with the stack back trace scan being stopped at a first match to a "victim" cache line, as described hereafter.

The rewriting of direct function calls is very similar to rewriting branches inside a function. However, unlike in the case of branches inside a function, the compiler generally does not have a complete view of all functions inside a program and thus, the compiler does not know the exact set of possible callers to a callee function. As a result, the compiler cannot pre-allocate space to record all call sites, i.e. the branch instruction that makes the function call which is also part of the source cache line, as in the case of branches inside a function.

The mechanisms of the illustrative embodiments address these problems by using a linked list based solution that is able to handle an arbitrary number of call sites, i.e. branch instructions that branch to, or "call," a portion of code corresponding to a target cache line, i.e. a callee function. For each callee function, i.e. each function called by a caller branch instruction, a linked list is dynamically constructed that records rewritten call sites that call the callee function.

The linked list node is constructed as part of an extended branch stub, which is referred to herein as a "call stub," which extends the branch stub described above with an additional quadword for tracking call sites. For example, in a first quadword, information corresponding to the branch stub previously described above is stored. In a second quadword, a linked list previous entry pointer and a linked list next entry pointer for pointing to entries in a linked list of call sites are stored. The linked list previous entry pointer points to a previous entry in the linked list and the linked list next entry pointer points to a next entry in the linked list. This provides a doubly linked list of call sites that facilitates a more simplified deletion process for deleting call sites from the linked list.

Figure 15:
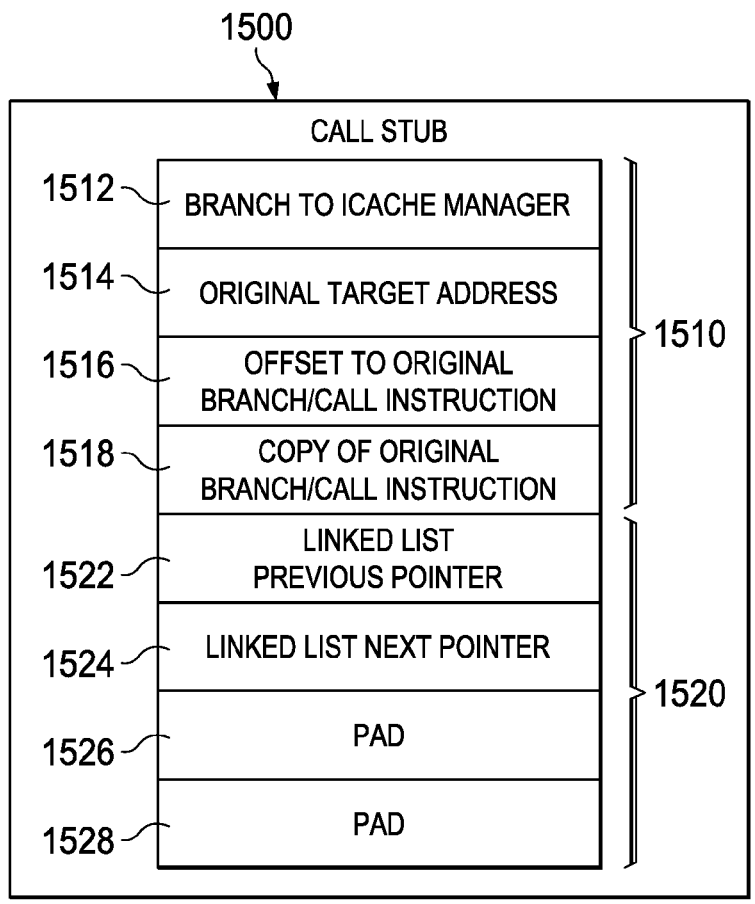
FIG. 15 is an example diagram illustrating a call stub in accordance with one illustrative embodiment.

FIG. 15 is an example diagram illustrating a call stub in accordance with one illustrative embodiment. As shown in FIG. 15, the call stub 1500 includes a first portion 1510, which may be a first quad word, that stores data similar to that of the branch stub previously described above. That is, the first portion 1510 stores, in a first word 1512, a link to the instruction cache manager in the case of a instruction cache miss. In a second word 1514, the target address for the original branch instruction or function call is stored. In a third word 1516, an offset to the original branch or call instruction is stored. In a fourth word 1518, a copy of the original branch or call instruction is stored.

In addition, the call stub includes a second portion 1520, which may be a second quadword, for storing linked list pointers for purposes of handling instruction cache eviction. As shown in FIG. 15, a first word 1522 of the second portion 1520 may store a linked list previous pointer that points to, i.e. stores an address for, a previous call stub in the linked list. A second word 1524 of the second portion 1520 may store a linked list next pointer that points to, i.e. stores an address for, a next call stub in the linked list. The third and fourth words 1526 and 1528 may be kept free and unused.

During runtime, if a cache line is evicted, the instruction cache manager determines whether the evicted cache line is the entry of a function. This determination may be done based on a tag placed on the cache directory when the cache line is loaded due to a function call or a separate table of function entry cache lines may be maintained, for example. Other ways of determining whether a cache line is an entry to a function may be used without departing from the spirit and scope of the illustrative embodiments.

If the cache line is the entry of a function, the cache line has additional information, before or after the actual code, that records the start of the doubly linked list of call sites. This additional information may be generated by the compiler and may be maintained by the instruction cache runtime system. The instruction cache manager may process the doubly linked list and each call site is "fixed" by restoring the target of the original call or branch instruction to point to the original target address rather than the call stub. This can be achieved by replacing the branch or call instruction with the copy of the original branch or call instruction stored in the fourth word 1518 of the first quadword 1510 in the call stub 1500 or the fourth word 1040 in the branch stub 1000 in FIG. 10. Since the information for performing this fix is stored in the call stub 1500 or branch stub 1000 this fix is made simple to implement by changing the binary code in the instruction cache to replace the branch instruction or call instruction.

In addition, the instruction cache manager may perform additional functionality for maintaining the doubly linked call site list. Whenever a cache line is evicted, the instruction cache manager processes the doubly linked call site list for the evicted cache line and checks whether any of the call sites is in the doubly linked call site list. If so, the call site has to be removed from the linked list otherwise, after eviction of the cache line, the doubly linked call site list may become corrupted. For example, the next pointer in the previous call stub maybe changed to point to the next pointer in the current call stub and the previous pointer in the next call stub may be changed to point to the previous call stub of the current call stub, thereby eliminating the current call stub from the linked list. Using this doubly linked call site list mechanism, an arbitrary number of call sites calling a callee function can be handled with undoing rewriting of call or branch instructions when the callee function is evicted.

Figure 16:
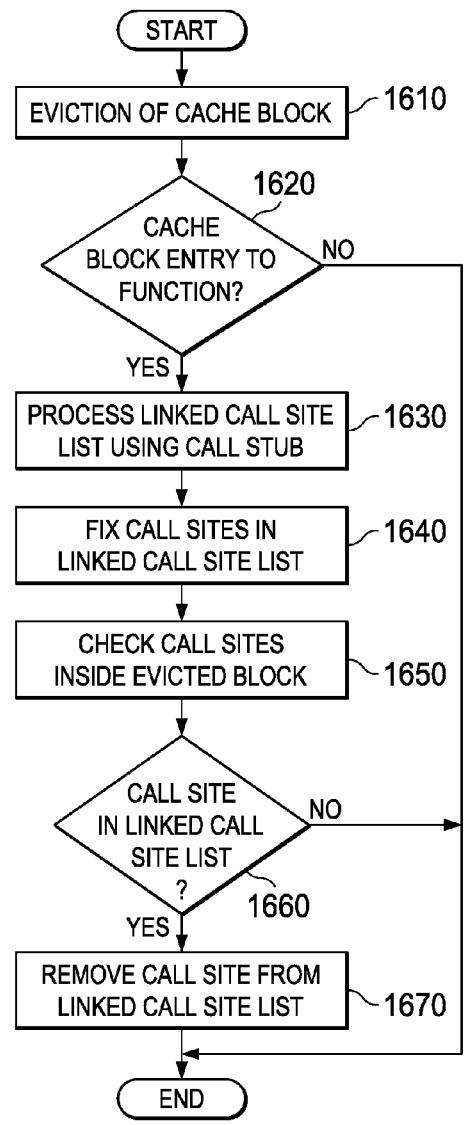
FIG. 16 is a flowchart outlining an example operation of an instruction cache manager when handling the eviction of a cache line in accordance with one illustrative embodiment.

FIG. 16 is a flowchart outlining an example operation of an instruction cache manager when handling the eviction of a cache line in accordance with one illustrative embodiment. As shown in FIG. 16, the operation starts with the eviction of a cache line (step 1610). A determination is made as to whether the cache line is an entry to a function (step 1620). If so, then a doubly linked call site list associated with the function is processed using the call stub of the function and any other call stubs linked to directly or indirectly by the call stub (step 1630). Call sites in the doubly linked call site list are fixed by restoring the target address from the call stubs corresponding to the call sites (step 1640). In addition, each call site inside the evicted block is checked (step 1650) to determine if the call site is present in the doubly linked call site list as the doubly linked call site list is processed (step 1660). If the call site is in the doubly linked call site list, then the call site is removed from the doubly linked call site list (step 1670). The operation then terminates.

Thus, in addition to providing mechanisms for rewriting branch instructions using branch stubs, the mechanisms of the illustrative embodiments may extend these branch stubs to call stubs that include pointers for a doubly linked list. These pointers may be used to maintain a doubly linked call site list that can be used during cache line eviction to determine which call sites need to be "fixed" by restoring the target addresses originally referenced in the call site branch or call instructions. Mechanisms for maintaining the doubly linked call site list are also provided. These mechanisms make eviction of cache lines with rewritten call site branch instructions or call instructions possible without corrupting the rewritten code.

To assist in handling the eviction of a cache line from the instruction cache, in addition to the mechanisms noted above, the illustrative embodiments may, for direct branches or calls to a target code block, where each code block is stored in its own cache line, further record a list of source code blocks that branch to or call the code in the target code block. Since the compiler has a complete view of the functions/procedures in the code, for each code block, the compiler knows the exact list of source code blocks that could directly branch to this target code block at runtime. The compiler just needs to record this information in the target code block so that it can be used by the instruction cache runtime system. With the mechanisms of the illustrative embodiments, the information regarding the list of source code blocks is recorded at the end of the target code block after all of the created branch stubs and call stubs.

Figure 17:
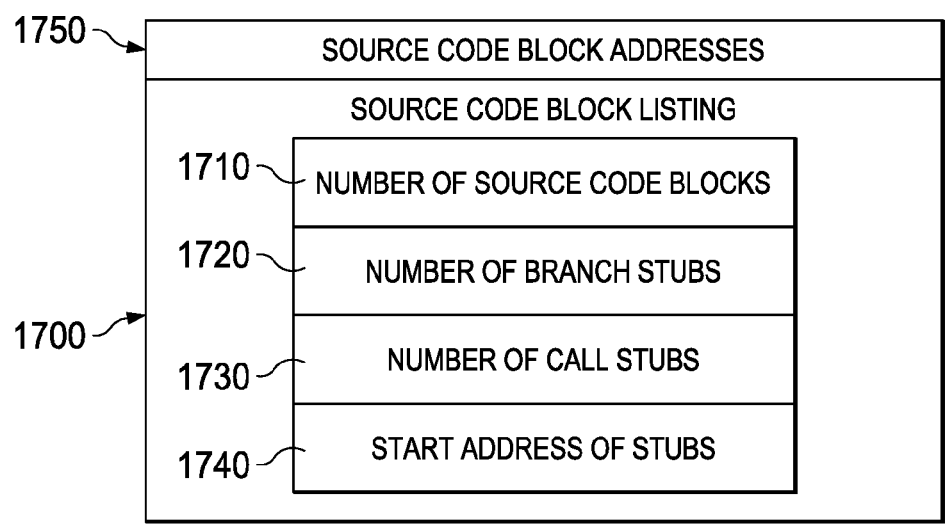
FIG. 17 is an example diagram illustrating one illustrative embodiment of a source code block listing quad word.

To store this list of source code blocks information, the last quad word of the current code block is reserved. FIG. 17 is an example diagram illustrating one illustrative embodiment of a source code block listing quad word. A first word 1710 of this quad word 1700 contains the number of source code blocks that could branch to the current code block at runtime. A second word 1720 of the quad word contains the number of branch stubs this current code block has. A third word 1730 of the quad word contains a number of call stubs this current code block has. A fourth word 1740 of the quad word contains the start address of the branch stubs and call stubs in the current code block. The locations, i.e. addresses, of the source code blocks 1750 are laid out just before the last quad word so that the instruction cache runtime system knows where to find them at runtime.

At runtime, when a cache line has to be evicted, the instruction cache manager needs to fix all the rewritten source code blocks with a target code block that is in the evicted cache line. To achieve this, the instruction cache manager in the instruction cache runtime system first fetches the last quad word of the evicted cache line, which will also be the last quadword of the code block since each code block is loaded into its own cache line. From the first word 1710 of the quad word 1700, the instruction cache manager knows how many source code block address have been encoded in the evicted cache line and where the list of addresses start. The instruction cache manager processes the potential source code blocks one by one. For each source code block, the instruction cache manager locates the source code block based on the source code block address encoded in the evicted cache line.

The instruction cache manager fetches the last quad word of that source block and examines the second word 1720 and fourth word 1740 of the quad word 1700. As previously mentioned above, the second word 1720 records the number of branch stubs in the source code block. The fourth word 1740 records the start address of the branch stubs. With this information, the instruction cache manager may examine each branch stub and check whether the branch stub is the one branching to the evicted cache line. Eventually, the instruction cache manager will find the branch stub that branches to the evicted cache line.

To fix the rewritten branch instruction that branches to the evicted cache line, the instruction cache manager copies the fourth word of the branch stub, i.e. word 1040 in FIG. 10, and replaces the rewritten branch instruction with the copy of the original branch instruction (prior to rewriting) stored in the fourth word 1040. As a result, the branch instruction is restored and does not directly branch to the evicted cache line, thereby eliminating the possibility of a direct branch to a wrong target block. To the contrary, the restored branch instruction will operate in the same manner as discussed above with regard to branching to the instruction cache manager to determine if the target block is in the instruction cache or not and bringing the required block of code into the instruction cache if it is not already present in the instruction cache.

Figure 18:
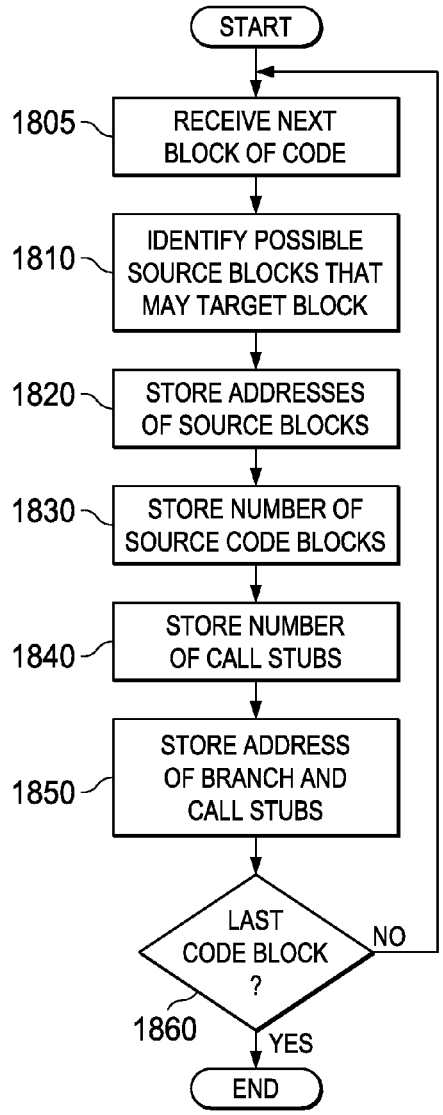
FIG. 18 is a flowchart outlining an example operation of a compiler when analyzing original code and inserting a list of possible source code blocks targeting a current code block in accordance with one illustrative embodiment.

FIG. 18 is a flowchart outlining an example operation of a compiler when analyzing original code and inserting a list of possible source code blocks targeting a current code block in accordance with one illustrative embodiment. As shown in FIG. 18, for a next block of code in received original code, the compiler identifies possible source blocks that may target the next block of code (step 1810). The addresses of the possible source code blocks are stored in a portion of the current code block after any branch stubs and/or call stubs created by the compiler (step 1820). The compiler stores a number of the source code blocks in a last portion of the current code block, e.g., the last quad word of the current code block (step 1830). The compiler further stores a number of call stubs in the last portion of the current code block (step 1840). The compiler further stores the start address of branch and call stubs in the current code block in this last portion of the current code block (step 1850). A determination is made as to whether this is the last code block to process or not (step 1860). If not, the operation returns to step 1810. Otherwise, the operation terminates.

Figure 19:
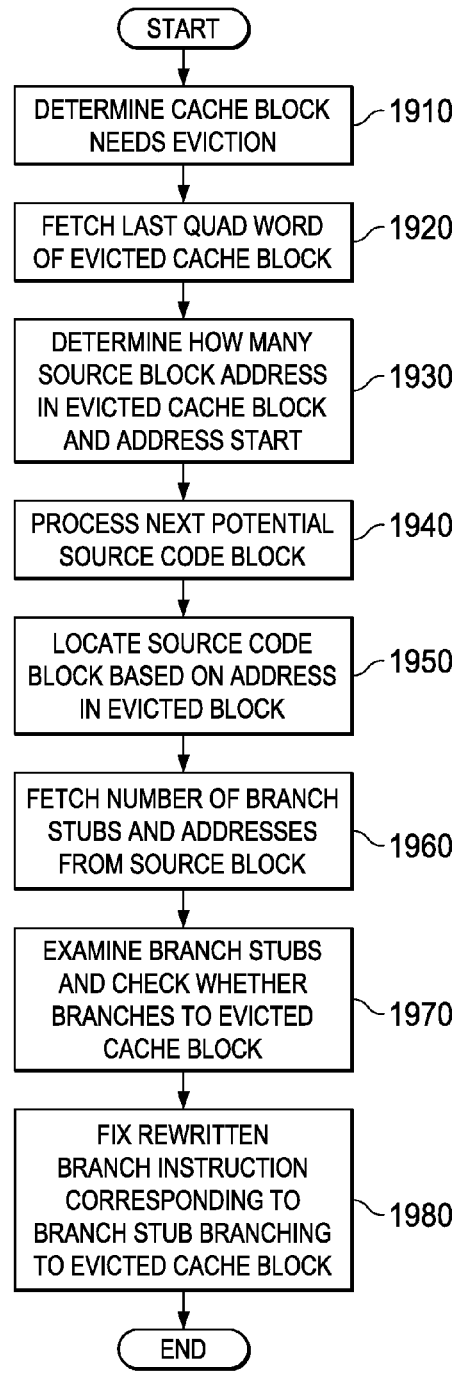
FIG. 19 is a flowchart outlining an example operation of the instruction cache runtime system in accordance with one illustrative embodiment, with regard to handling eviction of a cache line.

FIG. 19 is a flowchart outlining an example operation of the instruction cache manager in accordance with one illustrative embodiment, with regard to handling eviction of a cache line with direct branches to the evicted cache line. As shown in FIG. 19, the operation starts with determining that a cache line needs to be evicted (step 1910). The instruction cache manager fetches the last quad word of the evicted cache line (step 1920). From the first word of the quad word, the instruction cache manager determines how many source code block address have been encoded in the evicted cache line and where the list of addresses start (step 1930). The instruction cache manager processes a next potential source code block (step 1940). For the next source code block, the instruction cache manager locates the source code block based on the source code block address encoded in the evicted cache line (step 1950).

The instruction cache manager fetches the last quad word of that source block and examines the number of branch stubs and start address of the branch stubs in the last quad word (step 1960). The instruction cache manager examines each branch stub and checks whether the branch stub branches to the evicted cache line (step 1970). The instruction cache manager then fixes the rewritten branch instruction corresponding to a branch stub that branches to the evicted cache line, by copying the copy of the original branch instruction from the branch stub and replacing the rewritten branch instruction with the copy of the original branch instruction (step 1980). The operation then terminates.

With the direct-mapped software instruction cache mechanisms described above, conflict misses sometimes are a problem to the performance of the system. A conflict miss is a cache miss due to the replacement policy used by the software cache. For example, in direct-mapped caches, a code block can be only put, or "mapped," into one predefined cache line. Obviously, some code blocks may be mapped into the same cache line. If they are used repeated, only one of them can be kept in the cache even if there are many other unused cache lines. As a result, the cache manager has to load and evict these cache blocks repeatedly. Such cache misses are referred to as conflict misses.

To reduce the possibility of conflict misses, the illustrative embodiments may further provide a compiler mechanism that is able to collect and process all the objects, e.g., object files, or .o files, that together make up the executable code of a program, compiled by the compiler that utilize direct target jump optimizations such as those described above. The compiler builds a whole program call graph that lays out the objects and which objects call which other objects, as is generally known in the art. The compiler then partitions the call graph to minimize inter-partition transitions based on the instruction cache size, the size of each function, and the affinity among functions.

In order to achieve such partitioning, the illustrative embodiments weights the call graph by weighting the nodes in the call graph according to code size, and weights the edges of the call graph according to a number of calls between the particular objects at the ends of the edge. A maximally weighted edge in unprocessed edges of the call graph is selected and a determination is made as to whether the weights of the nodes associated with the selected edge are less than a cache line size. If so, then the nodes are merged into a new node with the weights being updated appropriately. If an edge having a maximum weight among unprocessed edges cannot be found, any remaining procedures are places in one node together in one cache line. In this way, the compiler tries to put high affinity functions into the same partition to reduce conflict misses.

Using such call graph partitioning and attempting to put high affinity functions into the same partition helps to reduce cache conflict misses for the following reasons. Under call graph partitioning, one "compilation unit" is created for each call graph partition. That is, after the call graph is partitioned into several sub-graphs, each of the sub-graphs, along with its procedures, is associated with a compilation unit for the compiler to operate on. The compiler takes one compilation unit, or partition, as input and lays out the code in it starting at the beginning of the instruction cache address space. Thus, the functions inside one call graph partition normally will not evict each other, as long as the code size for this call graph partition is smaller than the total instruction cache size.

With this call graph partitioning mechanism, the link-time optimizer first builds a global call graph in a manner generally known in the art. Each node in the global call graph is weighted according to the corresponding size of the code represented by the node in the global call graph. Each call graph edge is weighted according to a number of calls between the nodes associated with the edge. This information may all be determined statically by the compiler at compile time by analyzing the original code and determining the size of the portions of code in the compiled code that correspond to the nodes in the global call graph and determining an estimate of the number of calls anticipated between nodes, such as based on iterations in loops referencing portions of code, or the like. Thus, the weights may be determined through static program analysis or by profiling, for example, and the result may be a weighted call graph that may be the basis for the partitioning mechanisms. Of course other weightings may be used without departing from the spirit and scope of the illustrative embodiments.

Figure 20:
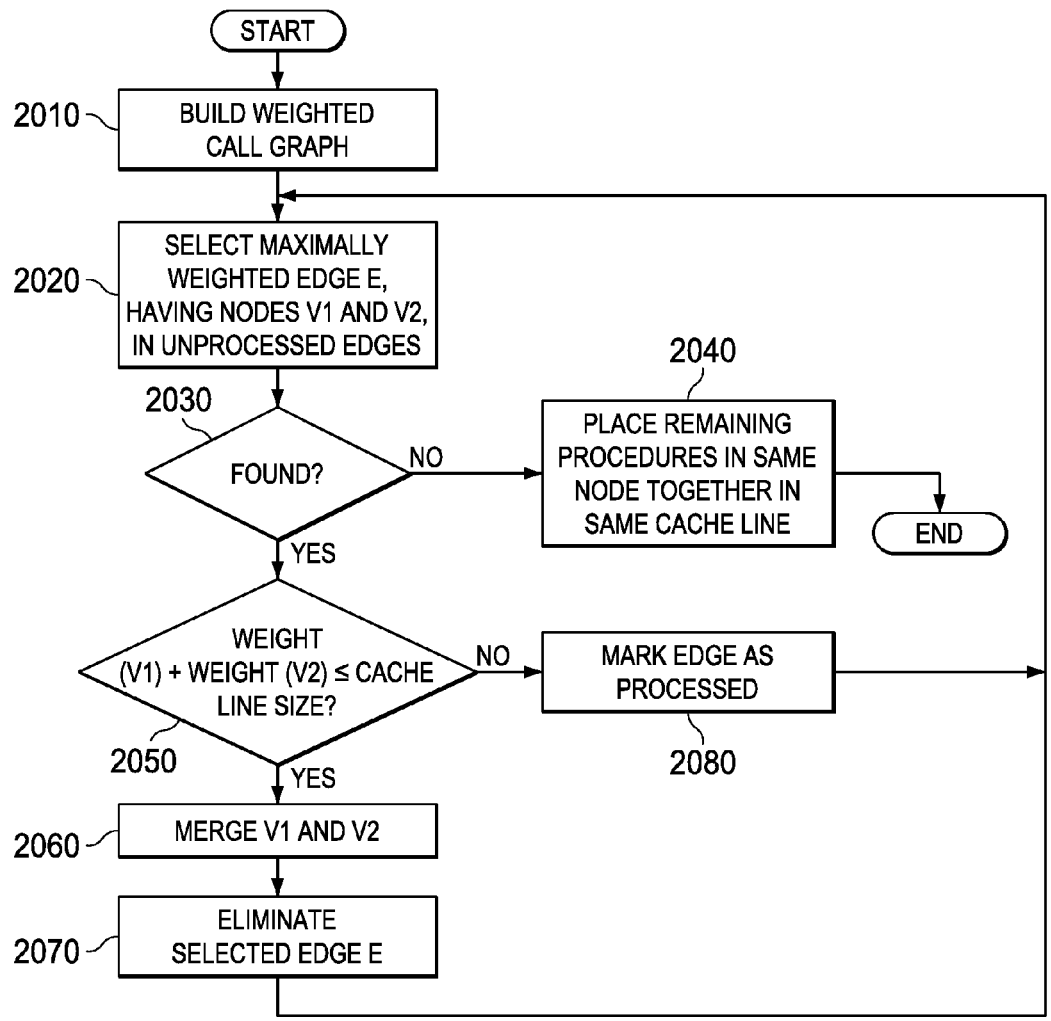
FIG. 20 is a flowchart outlining an example operation for performing code optimization using a partitioned call graph in accordance with one illustrative embodiment.

FIG. 20 is a flowchart outlining an example operation for performing code optimization using a partitioned call graph in accordance with one illustrative embodiment. As shown in FIG. 20, the operation starts by building a weighted call graph (step 2010). As noted above, the building of the weighted call graph starts by building a global call graph and then applying weights to the nodes and edges of the global call graph. The weights of nodes may be determined according to the code size, such as in bytes, associated with the nodes. The weights of edges may be determined based on an estimate of the number of calls between nodes of the particular edge. These weights are applied to the nodes and edges of the global call graph to thereby generate a weighted call graph.

A maximally weighted edge, in unprocessed edges of the call graph, is selected (step 2020). Assume for purposes of description that the selected edge is e and the nodes of the selected edge are v1 and v2. A determination is made as to whether such a maximally weighted edge can be found or not (step 2030). If not, any remaining procedures/functions are placed in the same node together in one cache line (step 2040) and the operation ends.

If a maximally weighted edge is found, a determination is made as to whether a sum of the weights of the nodes associated with the selected edge, e.g., weight(v1)+weight(v2), are less than or equal to a cache line size, e.g., a 1K cache line size or the like (step 2050). If so, then the nodes are merged into a new node with the weights being updated appropriately (step 2060). The merging of nodes into a new node places the binary code for the nodes together in the resulting binary code that is loaded into the instruction cache.

The weights of the new node may be set, for example, by setting the weight of the new node to the sum of the weights of the merged nodes, e.g., weight(vnew)=weight(v1)+weight(v2). The weight of the edges between this new node and other nodes previously connected to the nodes of the selected edge are set, for example, equal to the sum of the weights of the edges between these other nodes and the nodes of the selected edges, e.g., weight (edge(edge(vnew, v))=weight(edge(v1, v))+weight(edge(v2, v)) for all v. Of course other weightings may be used without departing from the spirit and scope of the illustrative embodiments. The selected edge e, i.e. edge (v1, v2), is then eliminated from the weighted call graph (step 2070) and the operation returns to step 2020 to select a next maximally weighted edge from the remaining unprocessed edges. If the sum of the weights of the nodes of the selected edge is greater than a cache line size, then the edge is marked as having been processed (step 2080) and the operation returns to step 2020.

The result is a partitioned call graph in which nodes are merged into sizes corresponding to the cache line size of the instruction cache based on their affinity. The resulting code is configured according to this partitioned call graph such that when the code is brought into the instruction cache the code fits within the cache lines of the instruction cache will minimal cross-cache line references. This greatly reduces conflict misses because of a cache line not being present in the instruction cache.

Thus, the illustrative embodiments provide mechanisms for directly jumping to branch targets in an instruction cache when possible through compiler implemented and runtime implemented rewriting of branch instructions and function calls. The illustrative embodiments further provide mechanisms for handling eviction of cache lines that correspond to rewritten branch instructions and function calls so as to avoid any jumps to incorrect targets in the instruction cache. Further, the illustrative embodiments provide mechanisms for reducing instruction cache conflict misses by partitioning the code based on instruction cache size, function size, and affinity amongst the functions. All of these mechanisms work together to improve the performance of a system's execution of the code by reducing latency encountered by the overhead of having to redirect execution to an instruction cache manager for every branch or function call.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for arranging binary code to reduce instruction cache conflict misses, comprising:

generating, by a processor of the data processing system executing a compiler, a call graph of a portion of code;

weighting, by the compiler, nodes and edges in the call graph to generate a weighted call graph;

partitioning, by the compiler, the weighted call graph according to the weights, affinities between nodes of the call graph, and the size of cache lines in an instruction cache of the data processing system, so that binary code associated with one or more subsets of nodes in the call graph are combined into individual cache lines based on the partitioning; and outputting, by the compiler, the binary code corresponding to the partitioned call graph for execution in a computing device, wherein partitioning the weighted call graph comprises performing the following operations iteratively until an edge having a maximum weight cannot be selected from unprocessed edges of the weighted call graph:

selecting an edge from the unprocessed edges of the weighted call graph that has a maximum weight of the weights of the unprocessed edges; and processing nodes of the selected edge.

2. The method of claim 1, wherein each node in the call graph is weighted according to a size of code associated with the node.

3. The method of claim 2, wherein each edge in the call graph is weighted according to an estimate of a number of calls between nodes of the edge.

4. The method of claim 3, wherein processing nodes of the selected edge further comprises:

determining if nodes of the selected edge should be merged into a new node or not; and merging the nodes of the selected edge into a new node in response to a determination that the nodes of the selected edge should be merged.

5. The method of claim 4, wherein determining if nodes of the selected edge should be merged into a new node or not comprising comparing weights of the nodes of the selected edge to a predetermined size of a cache line of an instruction cache of the data processing system.

6. The method of claim 5, wherein comparing weights of the nodes of the selected edge to the predetermined size of the cache line comprises:
   comparing a sum of the weights of the nodes to the predetermined size of the cache line; and
   in response to the sum of the weights of the nodes being less than or equal to the predetermined size of the cache line, merging the nodes into a new node.

7. The method of claim 6, wherein merging the nodes into a new node further comprises:
   setting a weight of the new node equal to a sum of the weights of the nodes of the selected edge;
   setting, for each other node coupled by an edge to one of the nodes of the selected edge, a weight of the edge to a sum of the weights of the edges between the other node and a corresponding one of the nodes of the selected edge; and
   eliminating the selected edge from the weighted call graph.

8. The method of claim 6, wherein, in response to the sum of the weights of the nodes not being less than or equal to the predetermined size of the cache line, marking the selected edge as processed.

9. The method of claim 1, wherein if an edge having a maximum weight in the unprocessed edges cannot be selected, any remaining procedures are combined into a single node in a single cache line.

10. A computer program product comprising a computer readable storage medium having a computer readable program stored therein, wherein the computer readable program, when executed on a data processing system, causes the data processing system to:
    generate a call graph of a portion of code;
    weight nodes and edges in the call graph to generate a weighted call graph;
    partition the weighted call graph according to the weights, affinities between nodes of the call graph, and the size of cache lines in an instruction cache of the data processing system, so that binary code associated with one or more subsets of nodes in the call graph are combined into individual cache lines based on the partitioning; and
    output the binary code corresponding to the partitioned call graph for execution in a computing device, wherein partitioning the weighted call graph comprises performing the following operations iteratively until an edge having a maximum weight cannot be selected from unprocessed edges of the weighted call graph:
    selecting an edge from the unprocessed edges of the weighted call graph that has a maximum weight of the weights of the unprocessed edges; and
    processing nodes of the selected edge.

11. The computer program product of claim 10, wherein each node in the call graph is weighted according to a size of code associated with the node.

12. The computer program product of claim 11, wherein each edge in the call graph is weighted according to an estimate of a number of calls between nodes of the edge.

13. The computer program product of claim 12, wherein processing nodes of the selected edge further comprises:
    selecting an edge from unprocessed edges of the weighted call graph;
    determining if nodes of the selected edge should be merged into a new node or not; and
    merging the nodes of the selected edge into a new node in response to a determination that the nodes of the selected edge should be merged.

14. The computer program product of claim 13, wherein determining if nodes of the selected edge should be merged into a new node or not comprising comparing weights of the nodes of the selected edge to a predetermined size of a cache line of an instruction cache of the data processing system.

15. The computer program product of claim 14, wherein comparing weights of the nodes of the selected edge to the predetermined size of the cache line comprises:
    comparing a sum of the weights of the nodes to the predetermined size of the cache line; and
    in response to the sum of the weights of the nodes being less than or equal to the predetermined size of the cache line, merging the nodes into a new node.

16. The computer program product of claim 15, wherein merging the nodes into a new node further comprises:
    setting a weight of the new node equal to a sum of the weights of the nodes of the selected edge;
    setting, for each other node coupled by an edge to one of the nodes of the selected edge, a weight of the edge to a sum of the weights of the edges between the other node and a corresponding one of the nodes of the selected edge; and
    eliminating the selected edge from the weighted call graph.

17. The computer program product of claim 15, wherein, in response to the sum of the weights of the nodes not being less than or equal to the predetermined size of the cache line, marking the selected edge as processed.

18. The computer program product of claim 10, wherein if an edge having a maximum weight in the unprocessed edges cannot be selected, any remaining procedures are combined into a single node in a single cache line.

19. An apparatus, comprising:
    a processor; and
    a memory coupled to the processor, wherein the memory comprises instructions that configure the processor to:
    generate a call graph of a portion of code;
    weight nodes and edges in the call graph to generate a weighted call graph;
    partition the weighted call graph according to the weights, affinities between nodes of the call graph, and the size of cache lines in an instruction cache of the data processing system, so that binary code associated with one or more subsets of nodes in the call graph are combined into individual cache lines based on the partitioning; and
    output the binary code corresponding to the partitioned call graph for execution in a computing device, wherein partitioning the weighted call graph comprises performing the following operations iteratively until an edge having a maximum weight cannot be selected from unprocessed edges of the weighted call graph:
    selecting an edge from the unprocessed edges of the weighted call graph that has a maximum weight of the weights of the unprocessed edges; and
    processing nodes of the selected edge.

* * * * *